(12) United States Patent
Stevens et al.

(10) Patent No.: US 11,307,014 B2
(45) Date of Patent: Apr. 19, 2022

(54) SYSTEM AND METHOD TO DIGITIZE CYLINDER HEAD COMBUSTION CHAMBERS

(71) Applicant: Paradyne Technologies Inc., Howard, PA (US)

(72) Inventors: Michael J. Stevens, Spring Mills, PA (US); Andrew K. Jenkins, Clearfield, PA (US); Milton T. McDonald, Morrisdale, PA (US)

(73) Assignee: Paradyne Technologies Inc., Howard, PA (US)

( * ) Notice: Subject to any disclaimer, the term of this patent is extended or adjusted under 35 U.S.C. 154(b) by 119 days.

(21) Appl. No.: 16/786,326

(22) Filed: Feb. 10, 2020

(65) Prior Publication Data

US 2020/0232778 A1     Jul. 23, 2020

Related U.S. Application Data

(63) Continuation of application No. 15/835,905, filed on Dec. 8, 2017, now Pat. No. 10,557,697.

(60) Provisional application No. 62/431,589, filed on Dec. 8, 2016.

(51) Int. Cl.
  *G01B 5/008* (2006.01)
  *G01B 5/20* (2006.01)
  *F02F 1/24* (2006.01)

(52) U.S. Cl.
  CPC ............... *G01B 5/20* (2013.01); *G01B 5/008* (2013.01); *F02F 1/24* (2013.01)

(58) Field of Classification Search
  CPC .................................. G01B 5/20; G01B 5/008
  USPC ............................................ 33/503; 702/168
  See application file for complete search history.

(56) References Cited

U.S. PATENT DOCUMENTS

| | | | |
|---|---|---|---|
| 7,296,365 B1 * | 11/2007 | St. Louis | G01D 11/30 |
| | | | 33/613 |
| 10,557,697 B1 * | 2/2020 | Stevens | G01B 5/20 |
| 2010/0119104 A1 | 5/2010 | Mamour | |
| 2012/0073154 A1 | 3/2012 | Matsumiya | |

(Continued)

*Primary Examiner* — George B Bennett
(74) *Attorney, Agent, or Firm* — Morgan, Lewis & Bockius LLP

(57) ABSTRACT

In one embodiment there is a computer numerical control machine implementing a method for measuring and digitizing a cylinder head combustion chamber using a touch probe, wherein the cylinder head combustion chamber includes an intake valve and an exhaust valve. The method includes receiving combustion chamber characteristics of the cylinder head combustion chamber. The method includes receiving probe measurement variables that describe how the touch probe measures the cylinder head combustion chamber. The method includes generating probe measurement lines for each portion of the cylinder head combustion chamber using the combustion chamber characteristics and the probe measurement variables. The method includes measuring, using the touch probe, probe measurement planes for each portion of the cylinder head combustion chamber using the probe measurement lines to generate probe measurements. The method includes digitizing the probe measurement planes for each portion of the cylinder head combustion chamber using the probe measurements.

22 Claims, 24 Drawing Sheets

(56) References Cited

U.S. PATENT DOCUMENTS

2014/0157611 A1 6/2014 Wada
2015/0135545 A1 5/2015 Graham

* cited by examiner

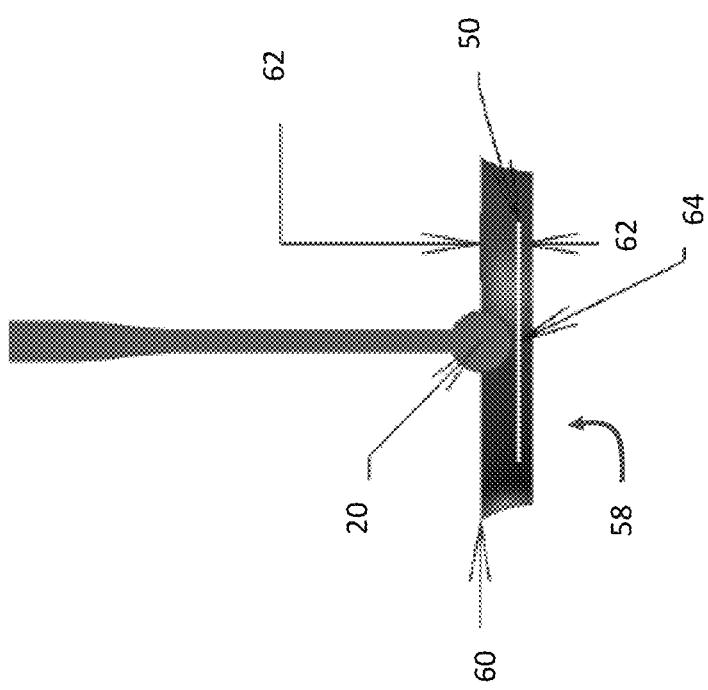

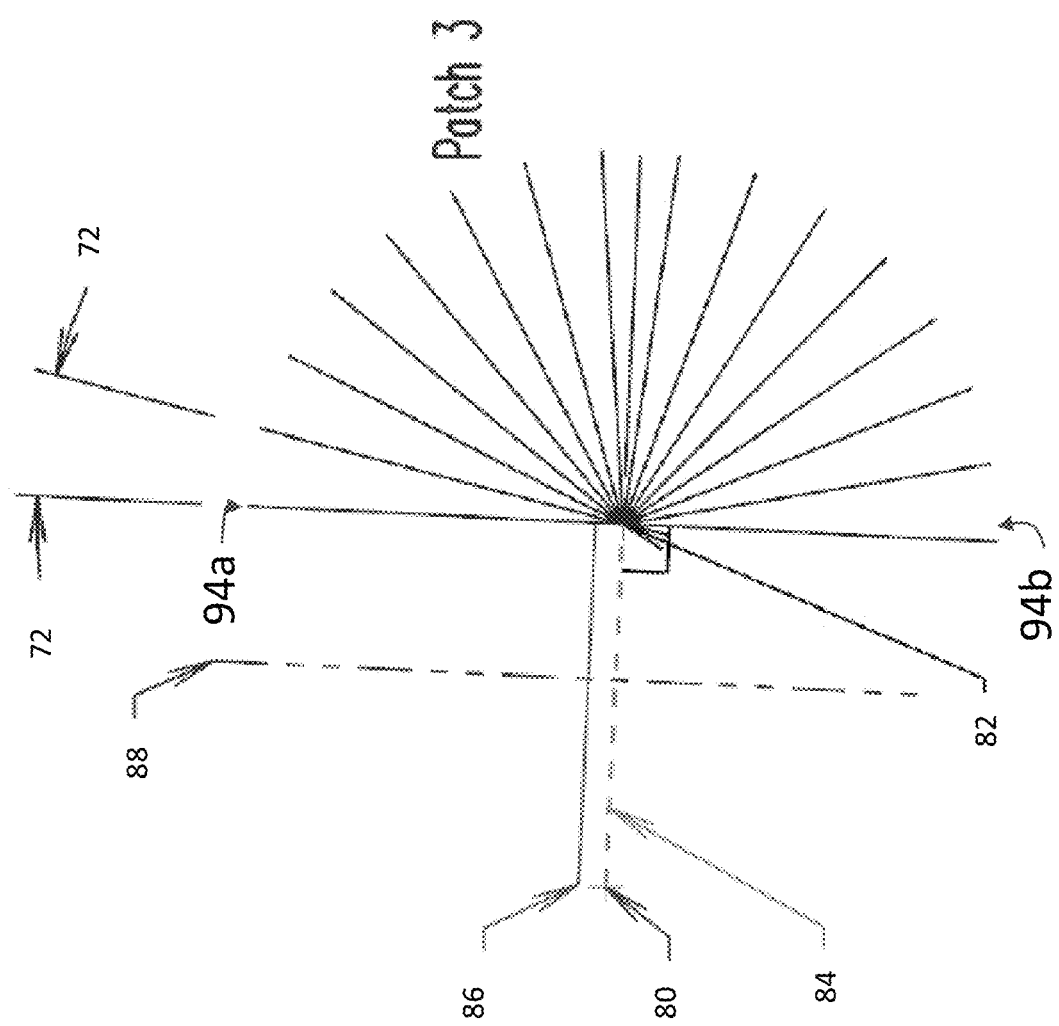

SYSTEM AND METHOD TO DIGITIZE CYLINDER HEAD COMBUSTION CHAMBERS

CROSS-REFERENCE TO RELATED APPLICATIONS

This application is a continuation of U.S. application Ser. No. 15/835,905, filed on Dec. 8, 2017 entitled "System and Method to Digitize Cylinder Head Combustion Chambers" which claims the benefit of U.S. Provisional Patent Application No. 62/431,589, filed Dec. 8, 2016, all of which is incorporated herein by reference in its entirety.

BACKGROUND

The present invention generally relates to digitizing objects and, more particularly, to a system and method to digitize objects such as cylinder head combustion chambers.

SUMMARY

In one embodiment, there is a computer numerical control (CNC) machine implementing a method for measuring and digitizing a cylinder head combustion chamber using a touch probe, wherein the cylinder head combustion chamber includes an intake valve and an exhaust valve. The method includes receiving combustion chamber characteristics of the cylinder head combustion chamber. The method includes receiving probe measurement variables that describe how the touch probe measures the cylinder head combustion chamber. The method includes generating probe measurement lines for each portion of the cylinder head combustion chamber using the combustion chamber characteristics and the probe measurement variables. The method includes digitizing probe measurement planes for each portion of the cylinder head combustion chamber by measuring, using the touch probe, the probe measurement planes for each portion of the cylinder head combustion chamber using the probe measurement lines.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 4A illustrates a cross-sectional side view of the exhaust valve seat, according to at least one embodiment of the invention.

FIG. 12A illustrates a schematic representation of the plurality of patch lines representing a third patch, according to at least one embodiment of the invention.

DETAILED DESCRIPTION

Figure 1:
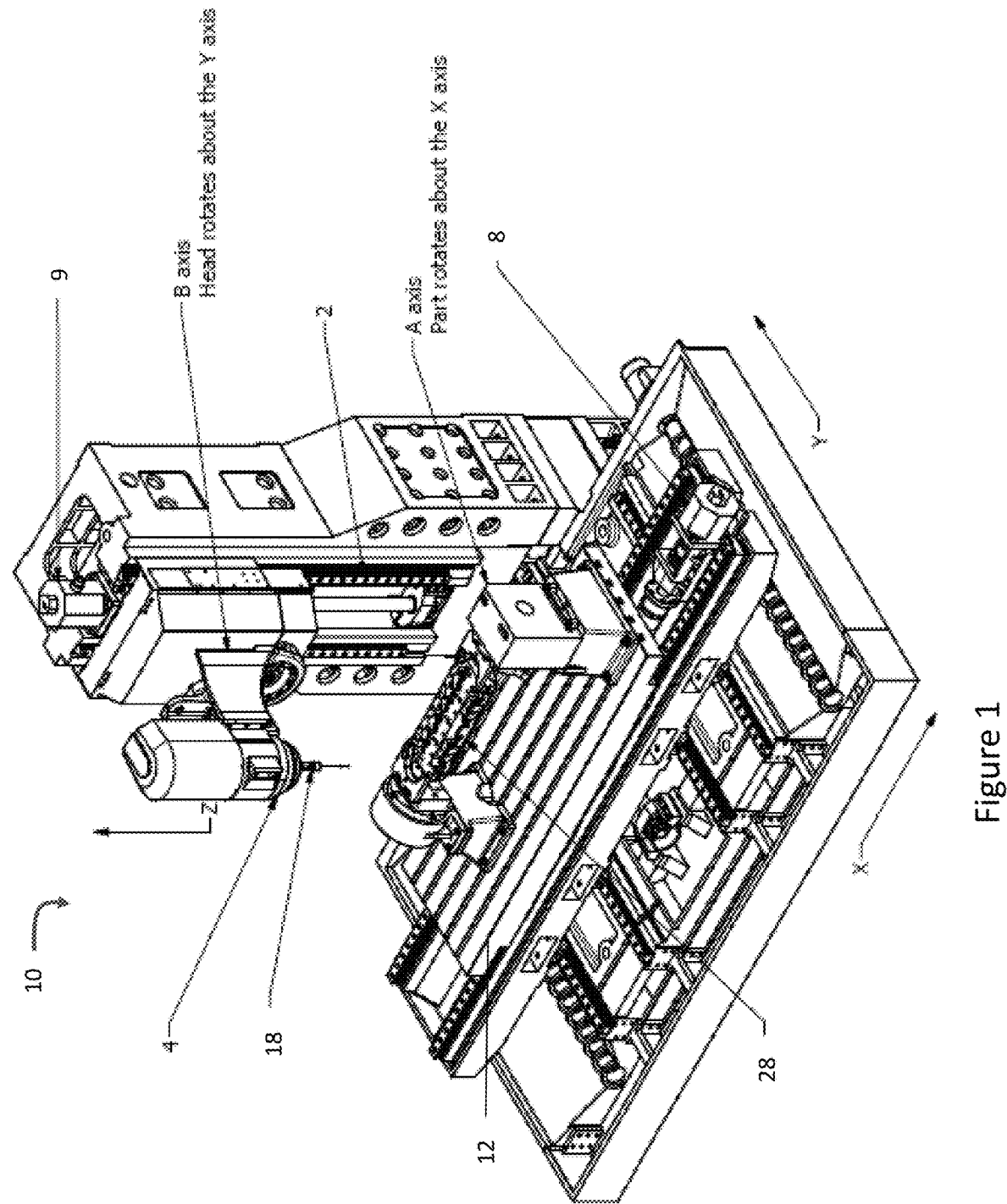
FIG. 1 illustrates a schematic representation of a CNC machine tool equipped with a digital probe, according to at least one embodiment of the invention.

Conventionally, an operator may utilize a multistep process in order to digitize a machine part (e.g., a combustion chamber) for manufacture. Initially, the operator may mount the cylinder head on a digitizing device, reference a zero position, establish program coordinates, and then run a program causing a touch probe (also referred to herein as "probe") to measure a position of the cylinder head along a line or plane. This process may be repeated multiple times until a sufficient number of positions of the template are properly measured. Then, the cylinder head may be transported to a separate CNC machine for further manufacture of the combustion chamber.

For digitizing a combustion chamber, due to the complex configuration of the combustion chamber valves, the process may be repeated many times to properly digitize the elements of the combustion chamber and could take a number of hours to complete because the operator must reposition the probe at a new zero position each time and reorient the CNC machine and probe before the probe measures a line of the cylinder head. This process is also time inefficient because the operator must measure extraneous points outside the bounds of the valves. Lastly, due to the need to transfer the cylinder head from the digitizing device to the CNC machine wastes time due to the need to further align the cylinder head once placed on the CNC machine. Therefore, there is a need for systems or methods that can be utilized to automate the digitizing process, integrate the digitizing process into the CNC machine and more efficiently digitize the combustion chamber by reducing the number of extraneous values being measured.

Referring to the drawings in detail, wherein like reference numerals indicate like elements throughout, there is shown in FIGS. 1-16, systems and methods for measuring and digitizing a combustion chamber using a probe, in accordance with exemplary embodiments of the present invention.

As used herein, in some embodiments, a probe may be defined as a probing device suitable for use in a computer numerical control (CNC) machine or a coordinate measuring machine (CMM) that trips when the probe stylus make physical contact with an object. In at least one embodiment, the methods described herein are implemented by a CNC machine or CMM that includes a probe. Examples are described in U.S. Pat. No. 8,082,642, filed Jan. 7, 2009, entitled "Articulating head with linear movement assembly for computer controlled milling machines" and U.S. Pat. No. 9,327,374, filed Aug. 5, 2013, entitled "CNC fixture", incorporated by reference herein in their entireties.

FIG. 1 illustrates a schematic representation of a CNC machine tool 10 equipped with a digital probe 18, according to at least one embodiment of the invention.

In some embodiments, the CNC machine tool 10 may include a table 12 movable relative to the head assembly 4 in the XY plane.

In some embodiments, the CNC machine tool 10 is a milling machine having three orthogonal axes combined with two rotary axes, such that the milling machine is a 5-axis milling machine. In some embodiments, the CNC machine tool 10 may include a moveable head assembly 4 which provides motion in the Z direction establishing orthogonal X, Y and Z directions. In some embodiments, including the embodiment shown in FIG. 1, the cylinder head 28 is rotatable about the X axis in the A direction, is placed on the table to rotate the cylinder head 28 along the X axis in the YZ plane. The head assembly 4 may also provide rotation in the B direction, which may be defined as rotating about the Y axis in the XZ plane.

In other embodiments, the three linear orthogonal axes and the two rotary axes may be rearranged in various permutations. For example, the A axis may be positioned horizontally in the XY plane or the B axis may be mounted on the A axis instead of on the Z axis.

In some embodiments, the CNC machine tool 10 may include a probe 18 having a stylus 20. The probe 18 may be attached to head assembly 4.

In some embodiments, the CNC machine tool 10 may include one or more motors, such as motors 8 and 9. Motor 8 may control motion of table 12 in the X and Y directions, respectively, while motor 9 may control the Z-direction motion of the probe 18, using linear guide ways 2. The rotary axes A and B also may contain motors. A cylinder head 28 containing one or more combustion chambers, whose position relative to machine 10 and/or surface geometry is to be determined, may be secured to rotary axis A in any convenient manner.

In some embodiments, the CNC machine tool 10 may include encoders (not shown). These encoders may provide feedback indicating the position of probe 18 with respect to the coordinate system of the CNC machine tool 10. A switch incorporated in probe 18 (not shown) may be configured to signal whether the probe is triggered (indicating that the stylus 20 is in contact with the surface of part 28) as the probe 18 traverses a specified path, or in its rest or non-triggered state.

In some embodiments, the CNC machine tool 10 may include one or more computers having one or more processors and memory (e.g., one or more nonvolatile storage devices) (not shown in FIG. 1). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

Exemplary Embodiments—Defining Variables and Selecting Digitizing Options

In some embodiments, before the CNC machine 10 causes the probe 18 to traverse a path along the cylinder head 28, an operator may specify a top plane, and one or more valve planes, such as an intake valve plane, and an exhaust valve plane of the cylinder head by positioning the probe at either a position of the top plane, and one or more valve planes and initiating a command at the CNC machine 10 to cause the CNC machine 10 to receive the position of the probe 18 at each plane position.

The operator may also specify step angle, step over distance and an overlap amount. In some embodiments, step angle may refer to the angle between each of the generated angular paths of probe 18 while measuring a curved surface. In some embodiments, step over distance may refer to the distance between each of the generated paths of probe 18. In some embodiments, overlap amount may refer to a number of patch lines overlapped by different patches.

In some embodiments, the operate may input step angle and step over distance amounts and initiate a command at the CNC machine 10 to cause the CNC machine 10 to receive data representative of the inputted step angle and step over distance amounts. After receiving data representative of step angle and step over distance, along with data representative of the top plane and valve planes of the cylinder head the CNC machine 10 calculate the automated movements of probe 18 to digitize the combustion chamber. Digitizing may refer to an algorithm that may automatically probe an arbitrary shape of an object on a plane with a probe 18 using previously collected data to determine a subsequent position of the probe 18. In some embodiments, one through five separate patches of lines may be created. The lines shown in the patches may become the pathways for the probe 18 to traverse while gathering digitized data. Ultimately, the measured data from the probe 18 will be used to create a tool path to recreate a combustion chamber.

Figure 2:
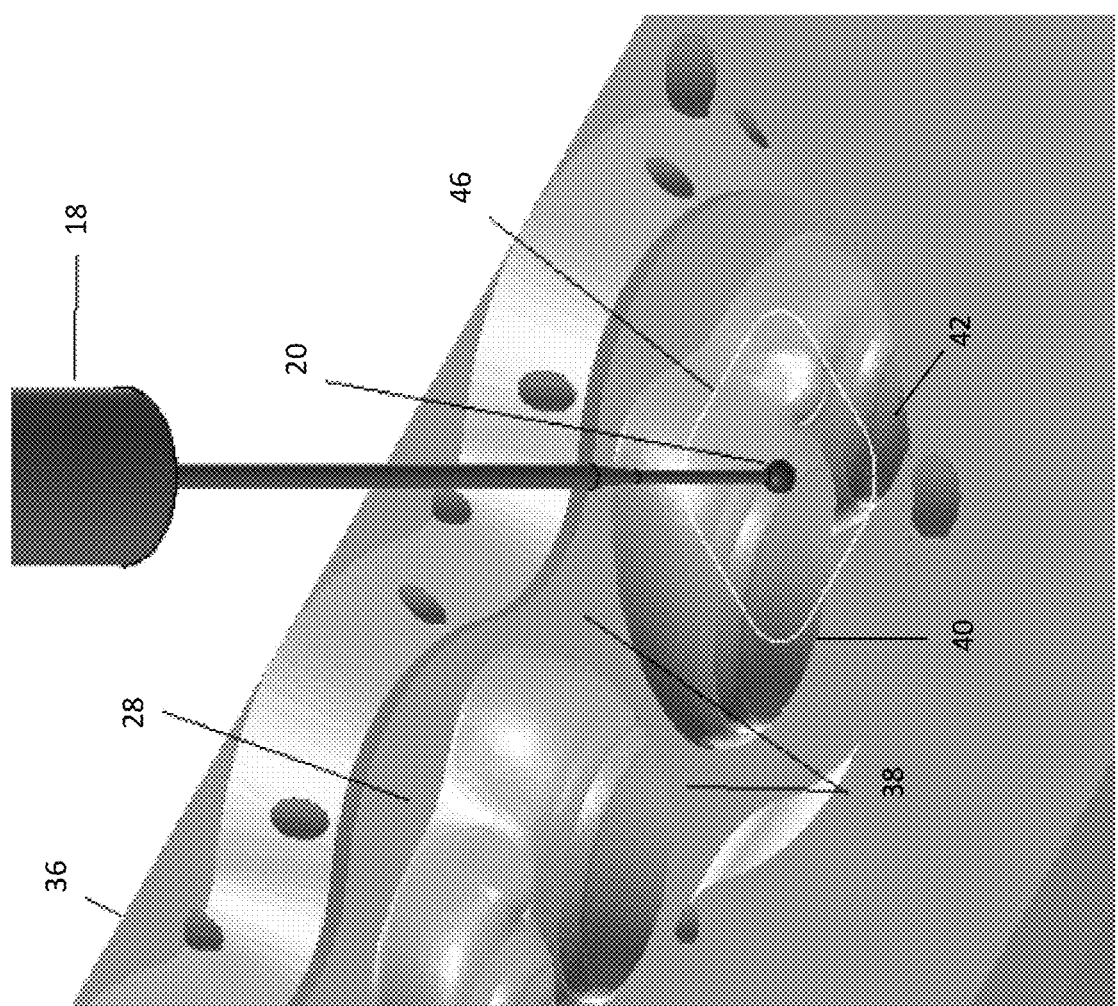
FIGS. 2 and 3 illustrate a perspective view of components of the cylinder head and probe of the CNC Machine tool, according to at least one embodiment of the invention.
Figure 3:
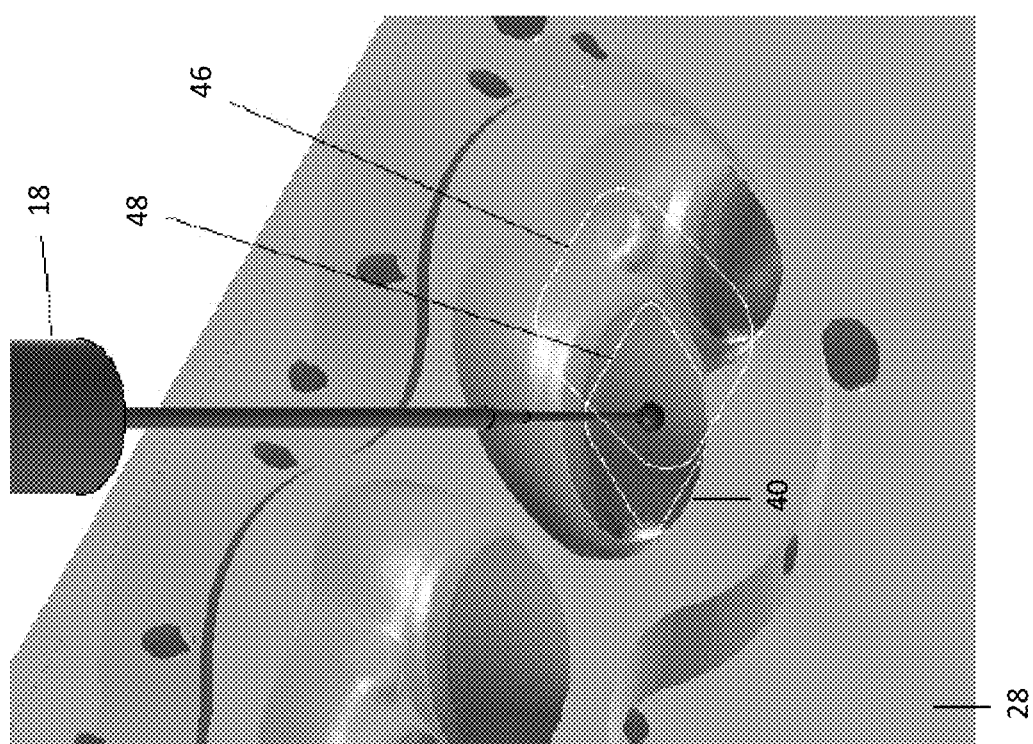
Figure 4:
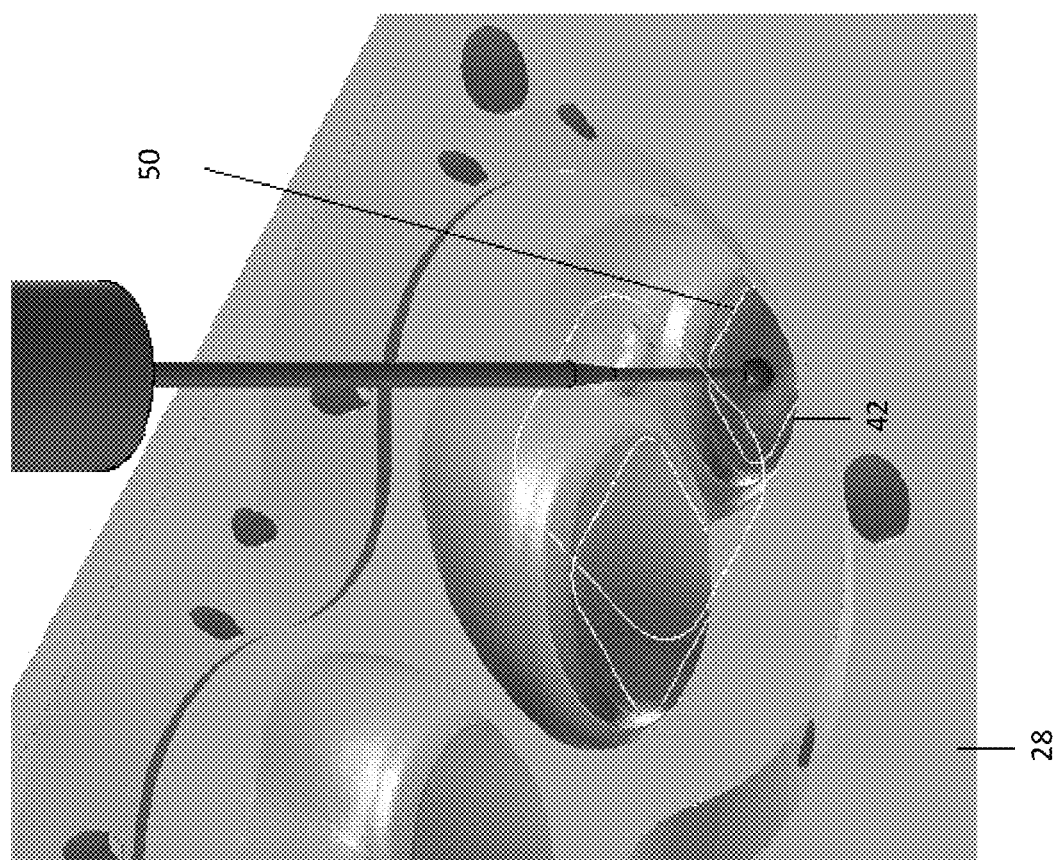
FIG. 4 illustrates a perspective view of components of the cylinder head and probe 18 of the CNC Machine tool, according to at least one embodiment of the invention.

FIGS. 2, 3 and 4 illustrate a perspective view of components of the cylinder head 28 and probe 18 of the CNC Machine tool 10, according to at least one embodiment of the invention.

In some embodiments, a cylinder head 28 is installed in a CNC machine 10 (not shown) using a standard fixture plate or by some other means. The CNC machine 10 may be positioned such that the probe 18 is perpendicular to the surface of the cylinder head 28. The CNC machine 10 is further positioned such that the probe is approximately at the center of the web between the valves in both directions.

As shown in FIG. 2, cylinder head 28 may include a fixture plate 36 and a deck surface 38. In some embodiments, cylinder head 28 may refer to a cylinder head used in an internal combustion engine. In some embodiments, deck surface 38 may refer to a precision surface on a cylinder head 28 that can mate to an engine block. In some embodiments, a fixture plate 36 may refer to a plate that connects the CNC machine 10 to the cylinder head 28.

Cylinder head 28 may also include two valves such as an intake valve 40 and/or an exhaust valve 42 for a cylinder. In some embodiments, an intake valve 40 may refer to a valve in the cylinder head of an internal-combustion engine that opens at the proper moment in the cycle to allow the fuel-air mixture to be drawn into the cylinder. In some embodiments, exhaust valve 42 may refer to a valve that releases burned gases from a cylinder. In some embodiments, the cylinder head 28 may include one, three, four, five, and/or no valves.

The probe 18 is positioned approximately at a top plane 46 of the cylinder head 28. The top plane 46 may be defined as a plane approximately at the deck surface of a cylinder head 28. In FIG. 2, the center of stylus 12 of probe 18 is positioned about 0.12 inches above the deck surface 38 approximately in the center of the combustion chamber of the cylinder head 28.

Once positioned, the operator may initiate a command at the CNC machine 10 to cause the CNC machine 10 to receive data representative of the position of the probe 18 at the plane position of the top plane 46. For example, when the "set top plane" button is pressed at the CNC machine 10, the X, Y, Z, A, B coordinates of the center of stylus 20 of probe 18 are received by the CNC machine 10. This point may be referred to as a Point "A" position. The center of the stylus 20 is the top point 45 and the plane defined by the top point 45 and the AB angle is the top plane 46.

Figure 3A:
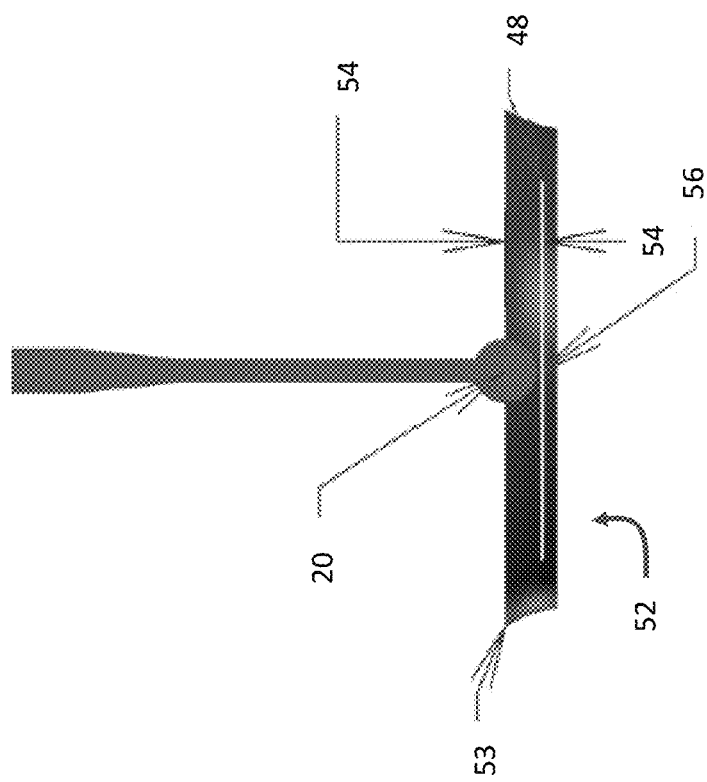
FIG. 3A illustrates a cross-sectional side view of the intake valve seat, according to at least one embodiment of the invention.

In FIG. 3, the probe 18 is positioned at an intake valve 40 of the cylinder head 28 and in some embodiments, approximately in the center of intake valve 40 to measure and define the intake valve plane 48. The intake valve plane 48 may refer to a plane perpendicular to the intake valve 40 approximately coplanar with the top of the intake valve seat 52. In some embodiments, intake valve seat 52 may refer to the surface of the surface of the cylinder head where the intake valve will contact once digitized. FIG. 3A illustrates a cross-sectional side view of the intake valve seat 52. In FIG. 3A a center of stylus 20 of probe 18 is positioned at a top 53 of intake valve seat 52. At this point, the operator may initiate a command at the CNC machine 10 to cause the CNC machine 10 to receive data representative of the position of the probe 18 at the plane position of the intake valve plane 48. For example, the operator may press a "Set Valve Plane 1" button. When the "Set Valve Plane 1" button is pressed, the X, Y, Z, A, B coordinates are recorded for the intake valve plane 48.

In some embodiments, when the "Set Valve Plane 1" button is pressed, the machine then finds the center of the valve opening on the current AB plane using the existing "Center of Bore" function. The CNC machine 10 executes the "Center of Bore" function twice and records four probed points on the second run. This way, the four recorded points are evenly spaced around the valve seat at the four quadrants. The CNC machine 10 then saves records the point data for later output with the digitized data.

After the probe 18 has been positioned in the center of the intake valve 40, the CNC machine 10 records the XYZAB position of the probe ball center. The CNC machine 10 may also record a probe 18 to intake valve plane distance 54, which may be the distance from the center of the stylus 20 to the intake valve plane 48. In some embodiments, the default is 0.2 inches. Intake valve point 56 is the point where the tip of stylus 20 meets intake valve plane 48.

In FIG. 4, the probe 18 is positioned at an exhaust valve 42 of the cylinder head 28, and in some embodiments, approximately in the center of exhaust valve 42 to measure and define the exhaust valve plane 50. The exhaust valve plane 50 may refer to a plane perpendicular to the exhaust valve 42 and coplanar with the top 60 of the exhaust valve seat 58. In some embodiments, exhaust valve seat 58 may refer to the surface of the surface of the cylinder head where the exhaust valve will contact once digitized. FIG. 4A illustrates a cross-sectional side view of the exhaust valve seat 58. In FIG. 4A a center of stylus 20 of probe 18 is positioned at a top 60 of exhaust valve seat 58. At this point, the operator may initiate a command at the CNC machine 10 to cause the CNC machine 10 to receive data representative of the position of the probe 18 at the plane position of the exhaust valve plane 50. For example, the operator may press a "Set Valve Plane 2" button. When the "Set Valve Plane 2" button is pressed, the X, Y, Z, A, B coordinates are recorded for the exhaust valve plane 50.

In some embodiments, when the "Set Valve Plane 2" button is pressed, the machine then finds the center of the opening exhaust valve 42 on the current AB plane using the existing "Center of Bore" function. The CNC machine 10 executes the "Center of Bore" function twice and records four probed points on the second run. This way, the four recorded points are evenly spaced around the exhaust valve seat 58 at the four quadrants. The CNC machine 10 then saves records the point data for later output with the digitized data.

After the probe 18 has been positioned in the center of the exhaust valve 42, the CNC machine 10 records the XYZAB position of the probe ball center. The CNC machine 10 may also record a probe to exhaust valve plane distance 62, which may be the distance from the center of the stylus 20 to the exhaust valve plane 48. In some embodiments, the default is 0.2 inches. Exhaust valve point 64 is the point where the tip of stylus 20 meets exhaust valve plane 50.

In some embodiments, additional digitizing variables may be defined, such as: first patch step angle and step-over; second patch step-over and step angle; third patch angular step-over and step angle; fourth patch step-over and step angle; fifth patch overlap distance; fifth patch step-over and step angle; and distance to digitize below intake valve plane 48 and exhaust valve plane 50.

Figure 5:
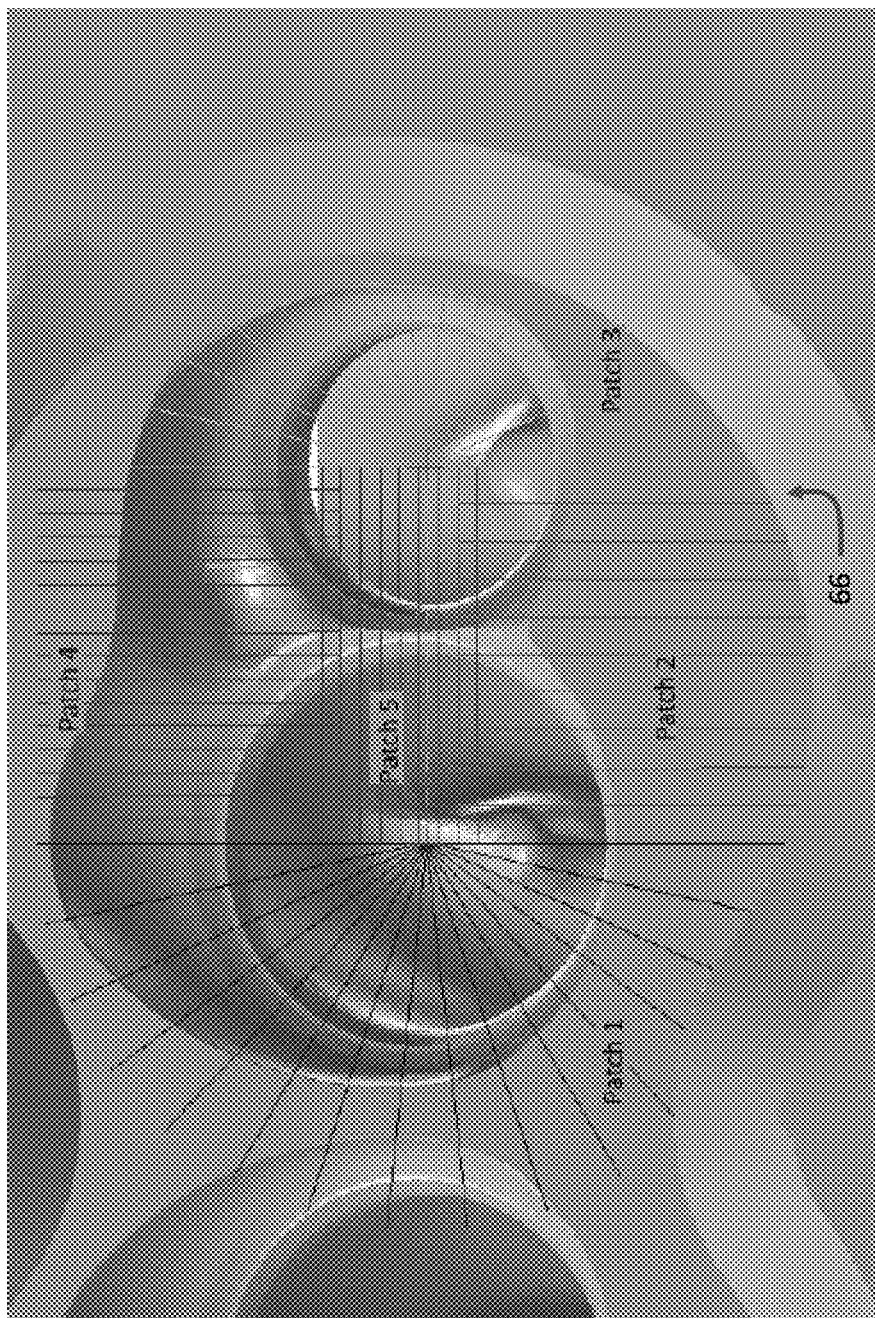
FIG. 5 illustrates a user interface of CNC machine showing the generated patches of probe paths that will be used in the digitizing run overlaid on the intake valve and exhaust valve of cylinder head, according to at least one embodiment of the invention.
Figure 6:
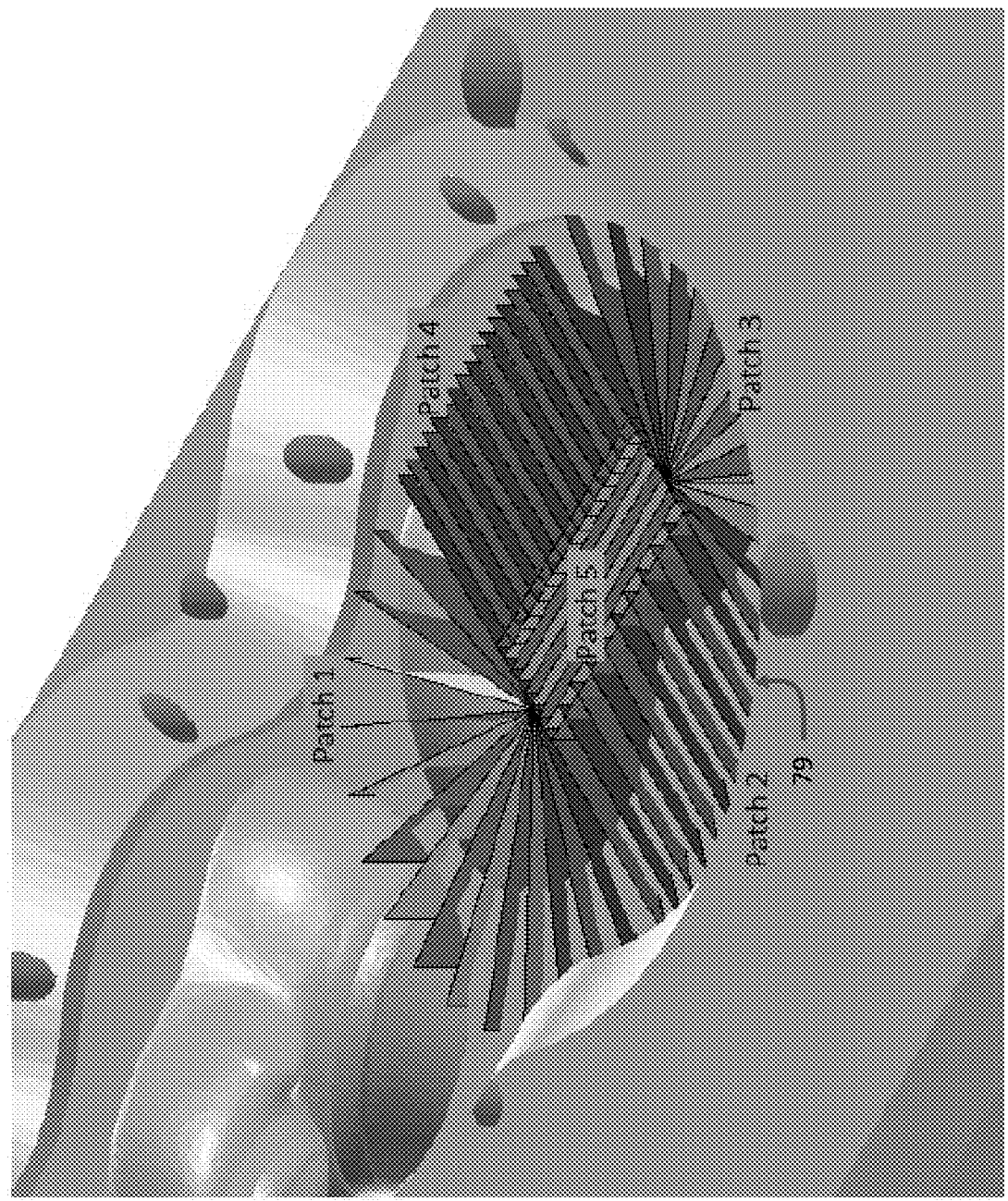
FIG. 6 shows the wall following planes that will be used by the probe of the CNC machine to digitize the combustion chamber, according to at least one embodiment of the invention.
Figure 7:
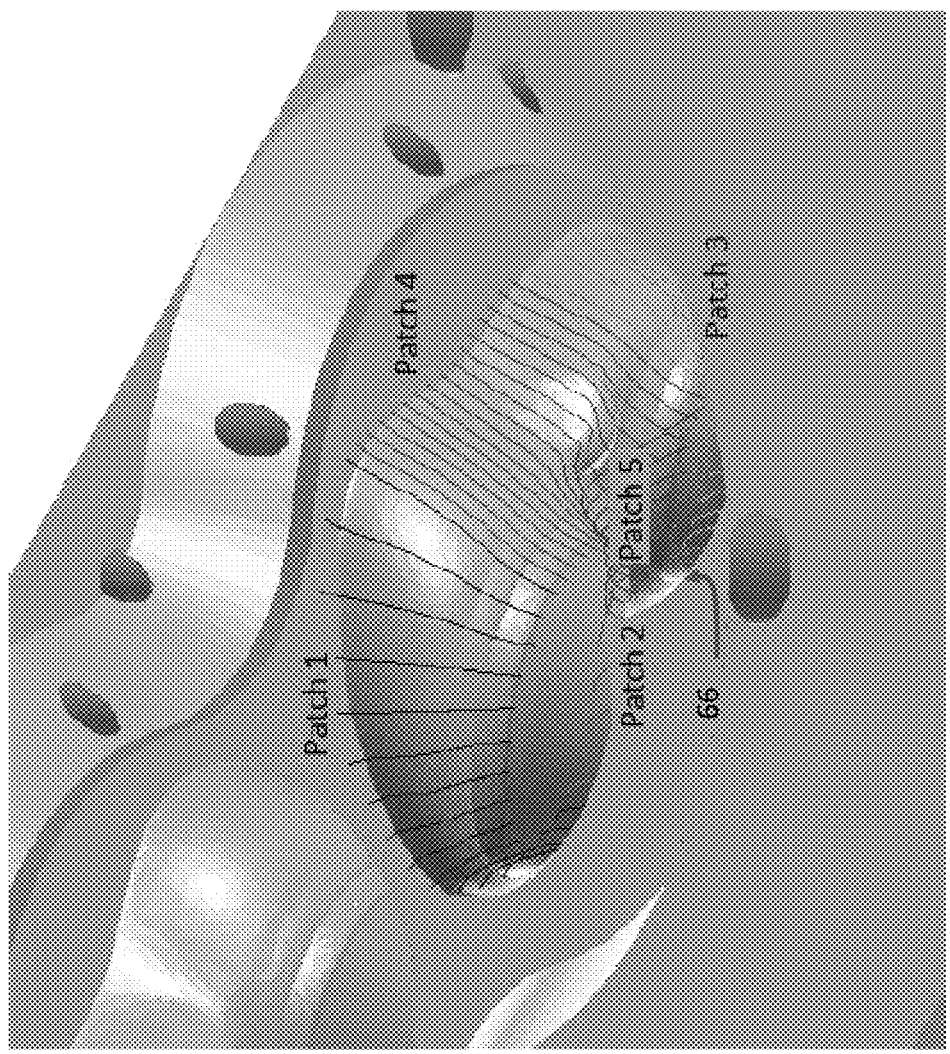
FIG. 7 illustrates the data gathered during the digitization process according to at least one embodiment of the invention.

In some embodiments, intake valve point 56 and exhaust valve point 64 are projected onto the top plane 46, where the top plane 46 is at an angle at a top plane angle. These points may be defined B' and C' respectively (or first projected point and second projected point, respectively. A line, B'C', may be generated on the top plane 46. This B'C' line and top plane 46 may be used to define all of the digitizing paths (or lines) and planes as shown in FIGS. 5, 6, and 7.

In some embodiments, a user may define one or more patch variables, including, but not limited to:

1. First patch and third patch step angle distance: a positive angular value (e.g., 10 degrees) may determine how far apart the planes of first patch and 3 are spaced angularly. A user may change the angular value. However, if changed, the angular value may need to be normalized such that the angle is an integer dividend of 180 degrees.

2. Planes in First patch and third patch: a positive integer value (e.g., 19) defining the number of planes there are in first patch and third patch. There may be three or greater planes.

3. The first patch and third patch step angle and planes in patch and third patch, may be mathematically linked, so if one changes, the other is updated accordingly. In some embodiments, the equation is patch and third patch step angle*(Planes in patch and third patch−1)=180.

4. First patch and third patch step over distance: the step over distance amount (e.g., 0.05 inches) for digitizing.

5. First patch and third patch radii: the radius of the first patch and third patch.

6. Second patch step over distance: A positive linear value (e.g., 0.07 inches) that may determine how far apart the planes of second patch are spaced linearly. The step over distance value may be normalized such that it is an integer dividend of the distance between first projected point and second projected point.

7. Planes in second patch: a positive integer value (e.g., 20) defining the number planes there are in Second patch. There may be three or greater planes, in some embodiments.

8. The variables second patch step over distance and planes in second patch, may be mathematically linked so if one changes, the other is updated accordingly. In some embodiments, the equation: second patch step over distance*(planes in second patch+1)=A distance between first projected point and second projected point.

9. Second patch step over distance: the step over distance amount (e.g., 0.05 inches) for digitizing.

10. Fourth patch step over distance: a positive linear value (e.g., 0.05 inches) that may determine how far apart the planes of fourth patch are spaced linearly. The step over distance value may be normalized such that it is an integer dividend of the distance between first projected point and second projected point.

11. Planes in fourth patch: a positive integer value (e.g., 30) defining the number of planes there are in Fourth patch. There may be 3 or greater planes, in some embodiments.

12. The variables fourth patch step over distance and planes in Fourth patch, may be mathematically linked, so if one changes, the other is updated accordingly. In some embodiments, the equation is fourth patch step over distance*(planes in fourth patch+1)=The distance between first projected point and second projected point.

13. Fourth patch step over distance: the step over distance amount (e.g., 0.05 inches) for digitizing.

14. Second patch and fourth patch overlap: a positive linear value that may determine a distance that the second patch and fourth patch overlap with the fifth patch.

15. Fifth patch width: a positive linear value (e.g., 1 inch) that may determine a total width of Fifth patch.

16. Fifth patch step over distance: a positive linear value (e.g., 0.05 inches) that may determine how far apart the planes of fifth patch are spaced linearly. The step over distance value may be normalized such that it is an integer dividend of the Fifth patch width.

17. Planes in fifth patch: a positive integer value (e.g., 21) defining the number of planes there are in Fifth patch. There may be three or greater planes, in some embodiments.

18. The variables fifth patch step over distance and planes in fifth patch, may be mathematically linked so if one changes, the other is updated accordingly. In some embodiments, the equation: fifth patch step over distance*(planes in fifth patch−1)=fifth patch width.

In some embodiments, a user may select digitizing options. For example, the user may select which patches to digitize. The user can choose to digitize any combination of first patch through fifth patch. This flexibility may save time re-digitizing completed patches in the event of an anomaly or if a user changes a small portion of a previously digitized chamber and needs a specific portion of the chamber re-digitized.

Generating Patch Lines and Digitizing Planes

In some embodiments, after receiving patch variables and digitizing options, the CNC machine 10 may generate patch lines and wall following planes that will later be used to digitize the combustion chamber.

FIG. 5 illustrates a user interface of CNC machine 10 showing the generated patches of probe paths that will be used in the digitizing run overlaid on the intake valve 48 and exhaust valve 50 of cylinder head 28, according to at least one embodiment of the invention. In some embodiments, a first patch (which may also be referred to herein as "Patch 1") may include a plurality of probe paths in the exhaust valve 42 that extend from exhaust valve point 64, where each probe path extends parallel to, or away from intake valve point 56. Each probe path of first patch may be separated by a step angle 68 (e.g., approximately 5-10 degrees). In some embodiments, a second patch (which may also be referred to herein as "Patch 2") may include a plurality of probe paths that are approximately perpendicular to an axis that extends through intake valve point 56 and exhaust valve point 64. Each probe path of second patch may be separated by a step-over distance 70 (e.g., approximately 0.08 inches). In some embodiments, a third patch (which may also be referred to herein as "Patch 3") may include a plurality of probe paths in the intake valve 40 that extend from intake valve point 56, where each probe path extends parallel to, or away from exhaust valve point 64. Each probe path of third patch may be separated by a step angle 72 (e.g., approximately 5-10 degrees). In some embodiments, a fourth patch (which may also be referred to herein as "Patch 4") may include a plurality of probe paths that are approximately perpendicular to an axis that extends through intake valve point 56 and exhaust valve point 64, but do not overlap with plurality of probe paths of second patch. Each probe path of fourth patch may be separated by a step-over distance 74 (e.g., approximately 0.08 inches). In some embodiments, a fifth patch (which may also be referred to herein as "Patch 5") may include a plurality of probe paths that are approximately parallel to an axis that extends through intake valve point 56 and exhaust valve point 64, and disposed between two separate axes that extend through each of intake valve point 56 and exhaust valve point 64, respectively, where the two axes may be perpendicular to the axis that extends through intake valve point 56 and exhaust valve point 64. Each probe path of fifth patch may be separated by a step-over distance 77 (e.g., approximately 0.08 inches). Each probe path of fifth patch may overlap paths of second patch and/or fourth patch by an overlap distance 78 (e.g., approximately 0.1 inches). Each patch shows the patch lines (e.g., patch line 66) (also referred to herein as "probe measurement lines") that represent the digitizing pathways (also referred to herein as "probe paths") that will be traversed by the probe 18 to create the digitizing data.

FIG. 6 shows the wall following planes that will be used by the probe 18 of the CNC machine 10 to digitize the combustion chamber, according to at least one embodiment of the invention. Plane 79 is an example of a digitized plane.

FIG. 7 illustrates the data gathered during the digitization process according to at least one embodiment of the invention. The multiple patches of data (e.g., first patch, second patch, third patch, fourth patch and fifth patch) are each represented by a different color (or shading).

In some embodiments, the patch lines of FIGS. 5 and 7 and the digitizing planes of FIG. 6 may be generated using the following method.

Figure 8A:
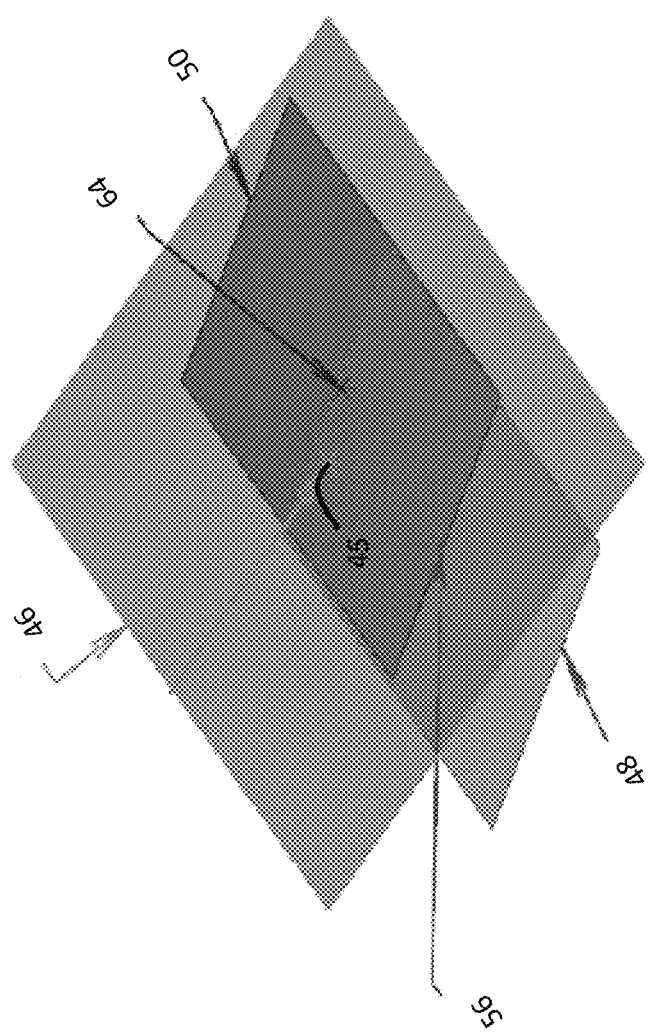
FIGS. 8A-8B illustrate a schematic representation of the top plane, intake valve plane, exhaust valve plane, intake valve projected point and exhaust valve projected point, according to at least one embodiment of the invention.
Figure 8B:
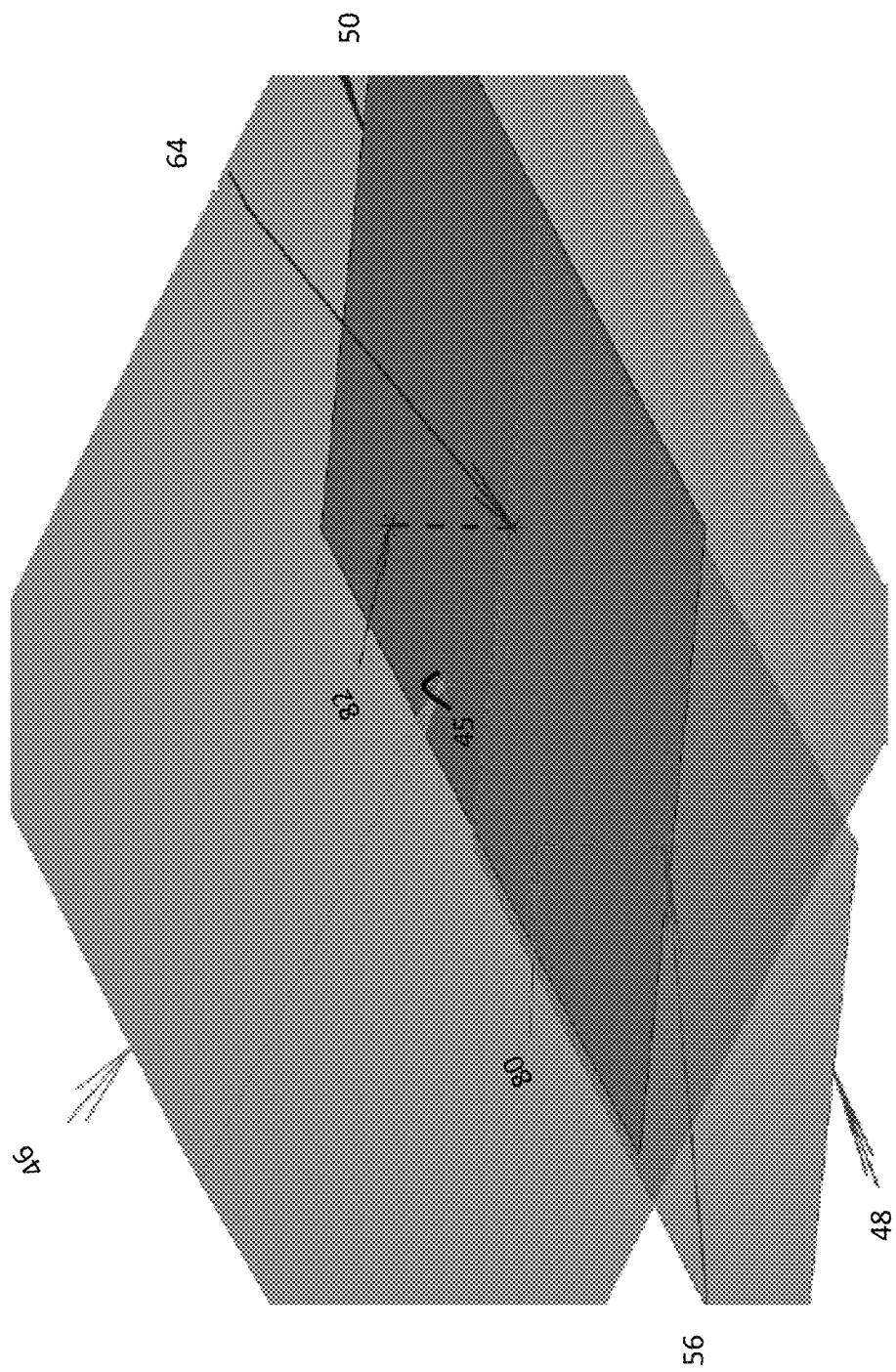

FIGS. 8A-8B illustrate a schematic representation of the top plane 46, intake valve plane 48, exhaust valve plane 50, intake valve projected point 80 and exhaust valve projected point 82, according to at least one embodiment of the invention. Initially, intake valve point 58 and exhaust valve point 64, shown in FIGS. 3A and 4A are projected onto the top plane 46, as intake valve projected point 80 and exhaust valve projected point 82 (shown in FIG. 8B). Intake valve projected point 80 and exhaust valve projected point 82 and top point 45 are used with several user entered variables to mathematically and geometrically determine all of the digitizing planes of FIG. 6.

Figure 9:
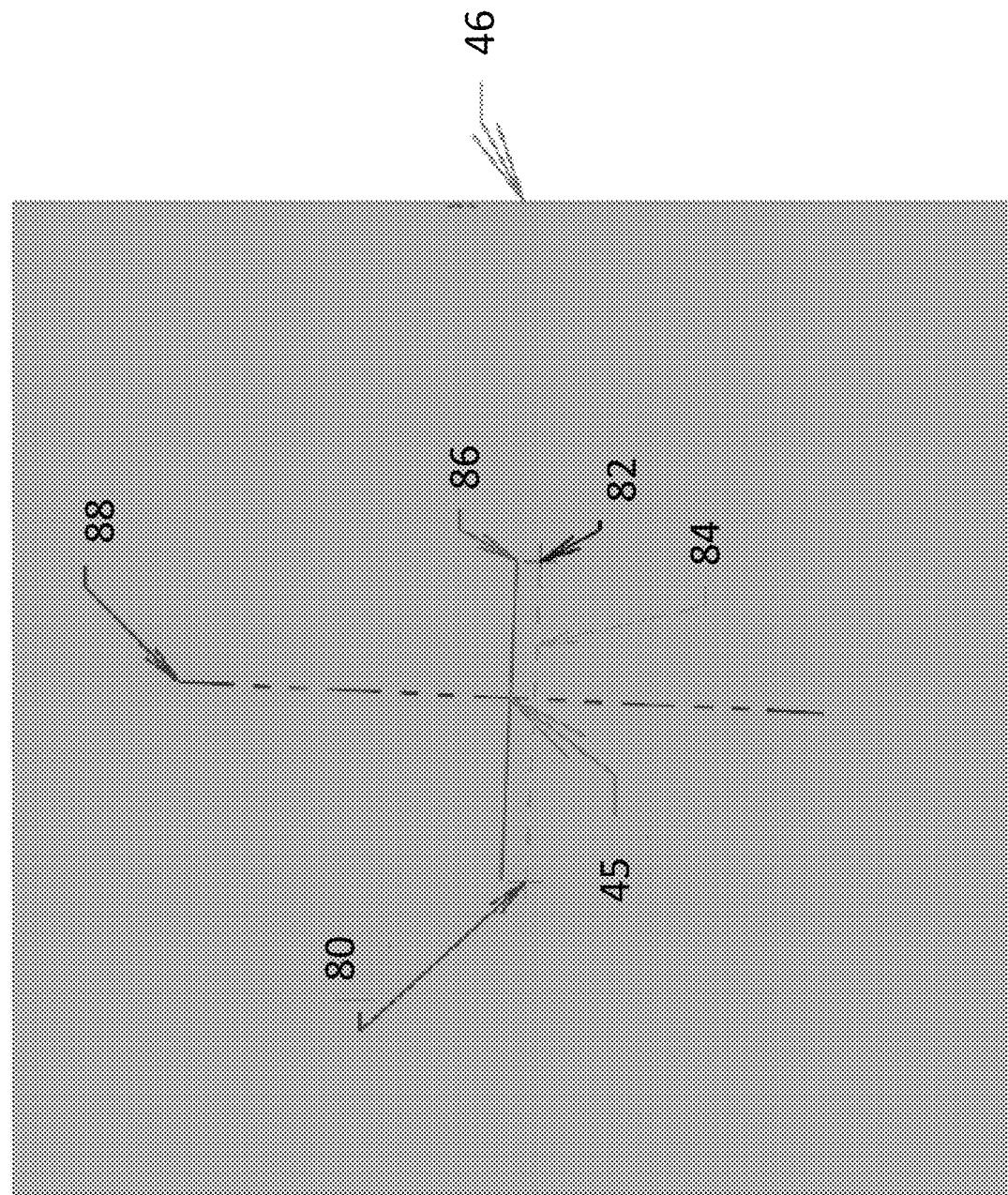
FIG. 9 illustrates a schematic representation of the top plane showing additional values generated for purposes of creating the digitizing planes, according to at least one embodiment.

FIG. 9 illustrates a schematic representation of the top plane 46 showing additional values generated for purposes of creating the digitizing planes, according to at least one embodiment.

After intake valve point 58 and exhaust valve point 64, shown in FIGS. 3A and 4A are projected onto the top plane 46, as intake valve projected point 80 and exhaust valve projected point 82, the CNC machine 10 may generate a valve line 84 may be generated. The valve line 84 may be a line extending from intake valve projected point 80 to exhaust valve projected point 82.

The CNC machine 10 may generate a fifth patch centerline 86. The fifth patch centerline 86 may be generated as a copy of the valve line 84. The fifth patch centerline 86 may be parallel to the valve line 84. The fifth patch centerline 86 may be at top plane 46, offset from the valve line 84 such that the fifth patch centerline 86 extends through the top point 45.

The CNC machine 10 may generate a web centerline 88. The web center line 88 may be perpendicular to the fifth patch centerline 86. The web center line 88 may be at top plane 46, such that the center line 88 extends through the top point 45.

Figure 10:
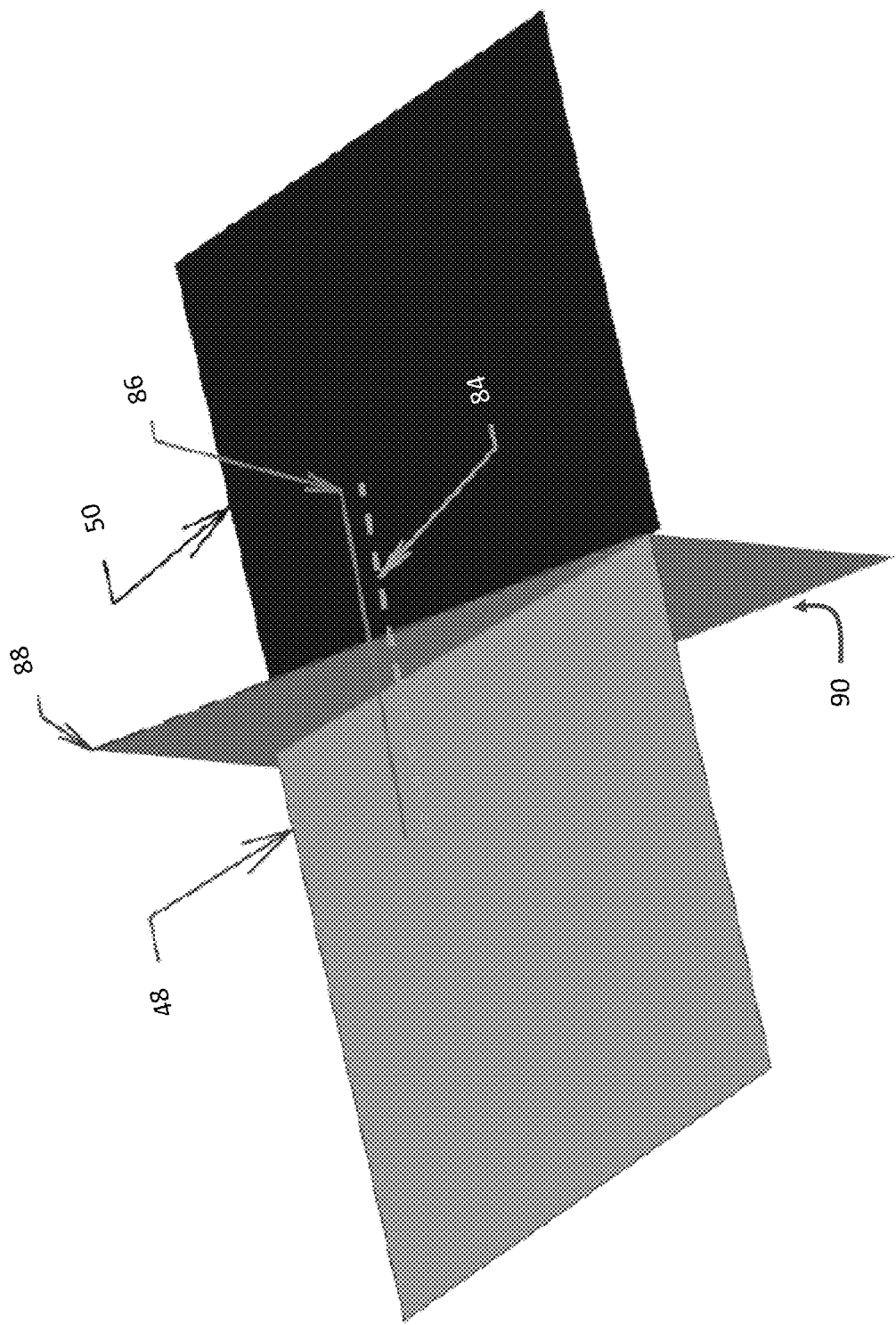
FIG. 10 illustrates a schematic representation of the web plane, intake valve plane and exhaust valve plane, according to at least one embodiment of the invention.

The CNC machine 10 may generate a web plane 90 that extends from the web centerline 88 and perpendicular to intake valve plane 48 and exhaust valve plane 50. Intake valve plane 48 and exhaust valve plane 50 may be trimmed to web plane 90. FIG. 10 illustrates a schematic representation of the web plane 90, intake valve plane 48 and exhaust valve plane 50, according to at least one embodiment of the invention.

Figure 11A:
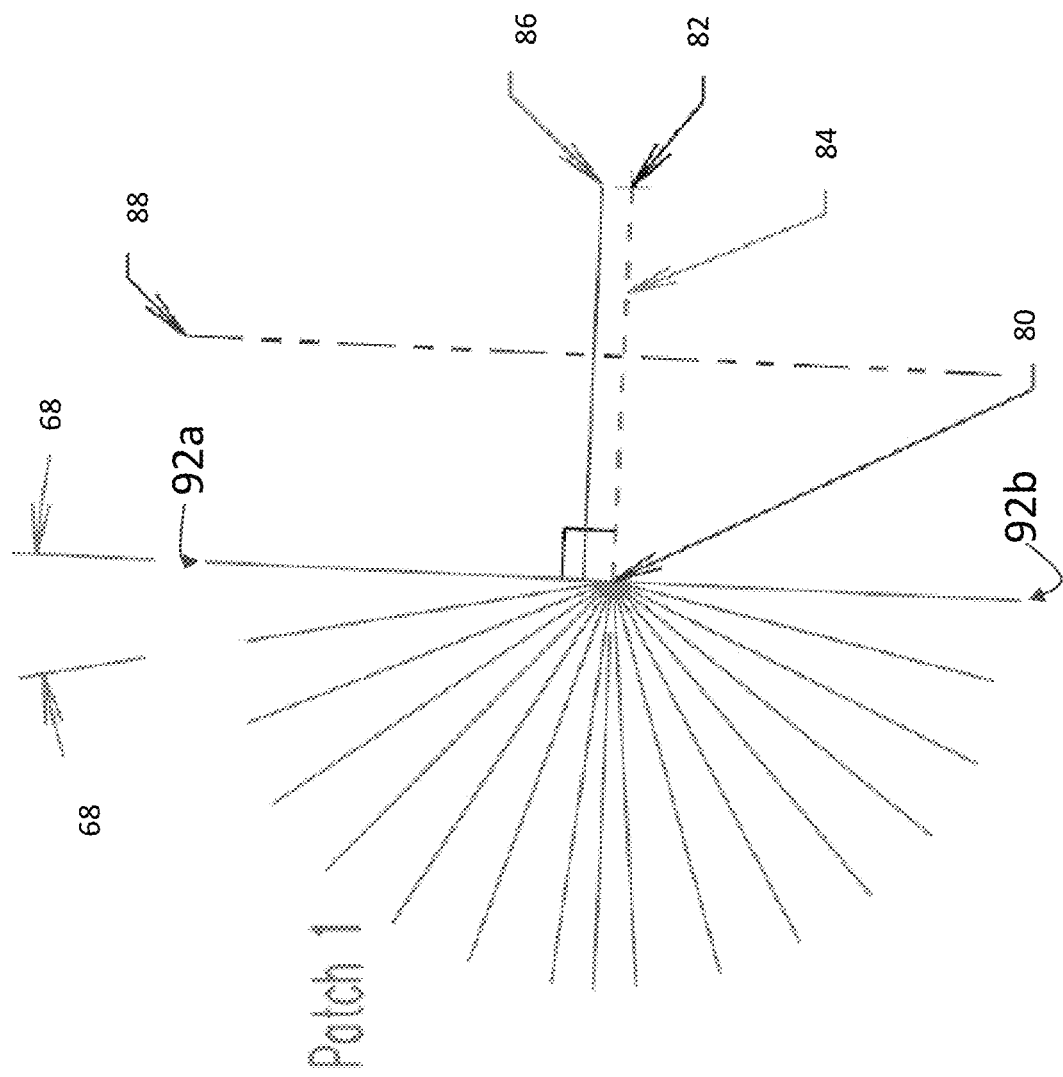
FIG. 11A illustrates a schematic representation of the plurality of patch lines representing a first patch, according to at least one embodiment of the invention.

The CNC machine 10 may generate a plurality of patch lines representing a first patch. FIG. 11A illustrates a schematic representation of the plurality of patch lines (e.g., patch line 92a) representing a first patch, according to at least one embodiment of the invention. The plurality of patch lines representing a first patch, including patch line 92a, may extend from intake valve projected point 80 on the top plane 46 (not shown). A first line representing a first patch (i.e., patch line 92a) may extend perpendicular to valve line 84. Each of the plurality of patch lines representing a first patch may have a radius approximately equal to half of the length of intake valve plane 48. Each additional line extending from about intake valve projected point 80 may be rotated by a step angle 68 until a line 92b is made parallel to the first line 92a.

Figure 11B:
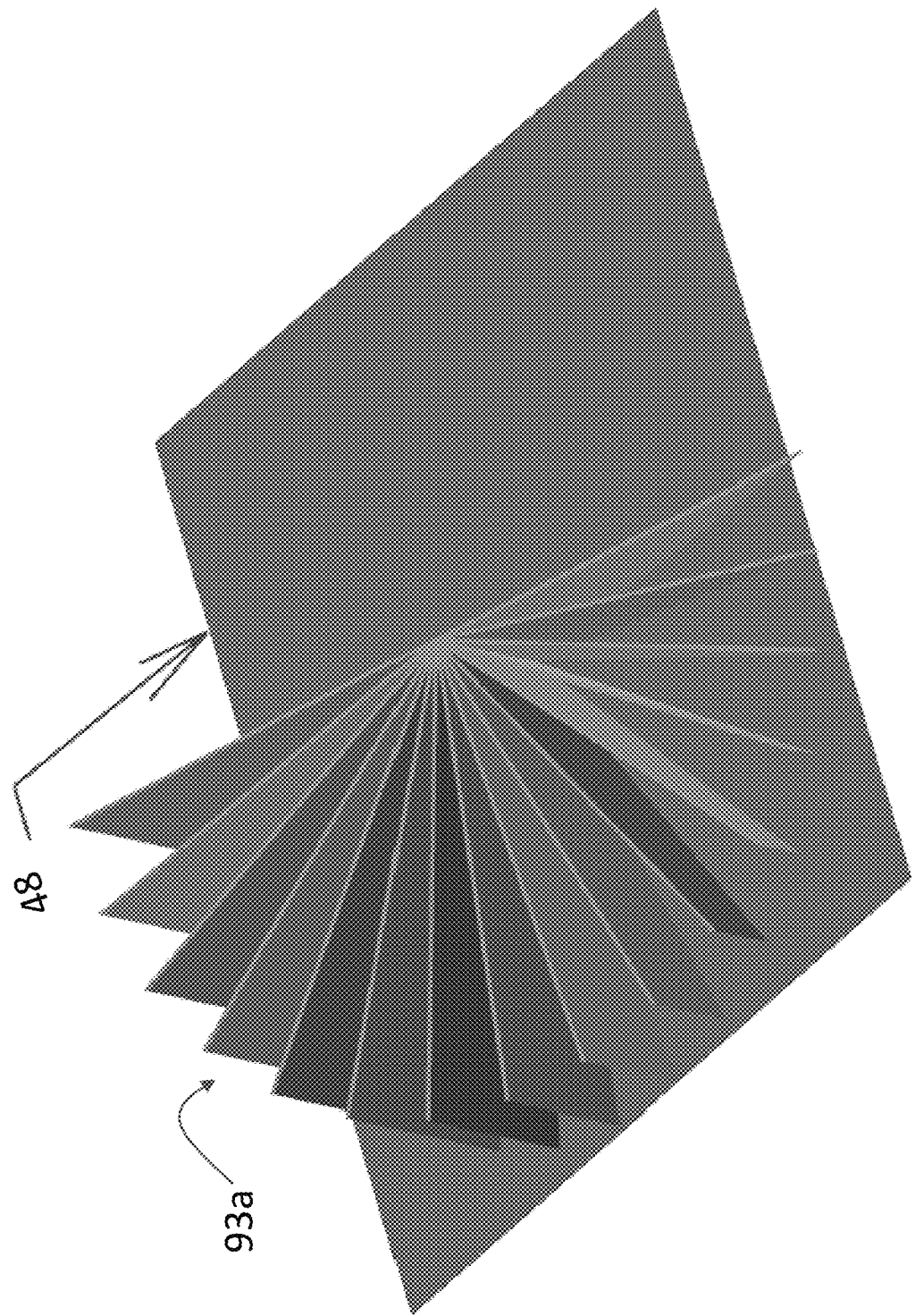
FIG. 11B illustrates a schematic representation of the digitizing planes of the first patch, according to at least one embodiment of the invention.

The CNC machine 10 may generate digitizing planes (e.g., plane 93a) that extend from each of the lines representing a first patch. The digitizing planes may be perpendicular to the top plane 46. The digitizing planes may extend between intake valve plane 48 and top plane 46. FIG. 11B illustrates a schematic representation of the digitizing planes of the first patch, according to at least one embodiment of the invention.

The CNC machine 10 may generate a plurality of patch lines representing a third patch. FIG. 12A illustrates a schematic representation of the plurality of patch lines (e.g., patch line 94a) representing a third patch, according to at least one embodiment of the invention. The plurality of patch lines representing a third patch, including line 94a, may extend from exhaust valve projected point 82 on the top plane 46 (not shown). A first line representing a third patch (i.e., patch line 94a) may extend perpendicular to valve line 84. Each of the plurality of patch lines representing a first patch may have a radius approximately equal to half of the length of exhaust valve plane 50. Each additional line extending from about exhaust valve projected point 82 may be rotated by a step angle 72 until a line 94b is made parallel to the first line 94a.

Figure 12B:
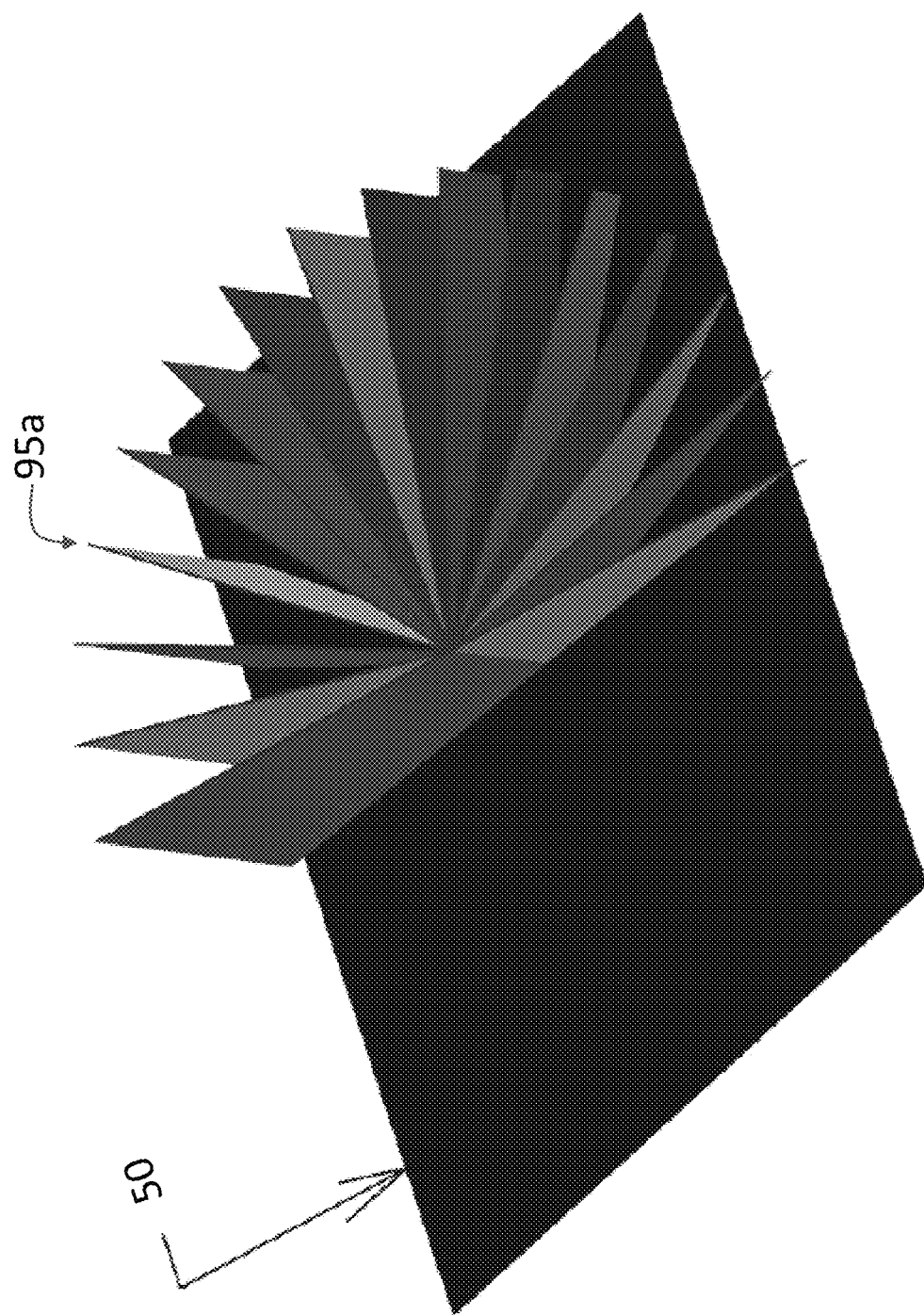
FIG. 12B illustrates a schematic representation of the digitizing planes of the third patch, according to at least one embodiment of the invention.

The CNC machine 10 may generate digitizing planes (e.g., plane 95a) that extend from each of the lines representing a third patch. FIG. 12B illustrates a schematic representation of the digitizing planes of the third patch, according to at least one embodiment of the invention. The digitizing planes may be perpendicular to the top plane 46. The digitizing planes may extend between exhaust valve plane 50 and top plane 46.

Figure 13A:
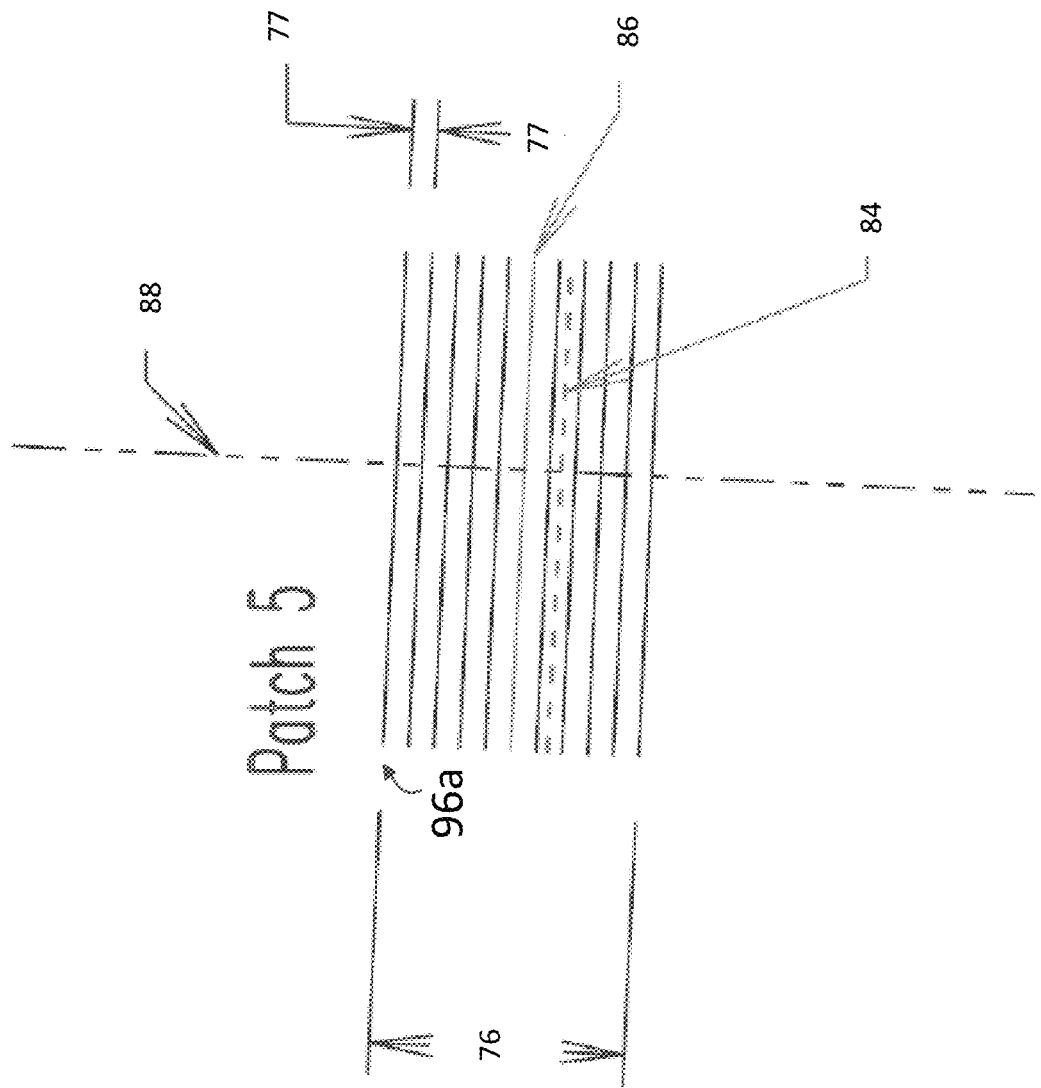
FIG. 13A illustrates a schematic representation of the plurality of patch lines representing a fifth patch, according to at least one embodiment of the invention.

The CNC machine 10 may generate a plurality of patch lines representing a fifth patch. FIG. 13A illustrates a schematic representation of the plurality of patch lines (e.g., patch line 96a) representing a fifth patch, according to at least one embodiment of the invention. The plurality of patch lines representing a fifth patch, including line 96a, may be parallel to valve line 84 and fifth patch centerline 86. An equal amount of a subset of the plurality of patch lines representing a fifth patch may be generated on each side of fifth patch centerline 86. The plurality of patch lines representing a fifth patch may be equally spaced by a step over distance 77. The plurality of patch lines representing a fifth patch may be a total width of approximately 1 inch.

Figure 13B:
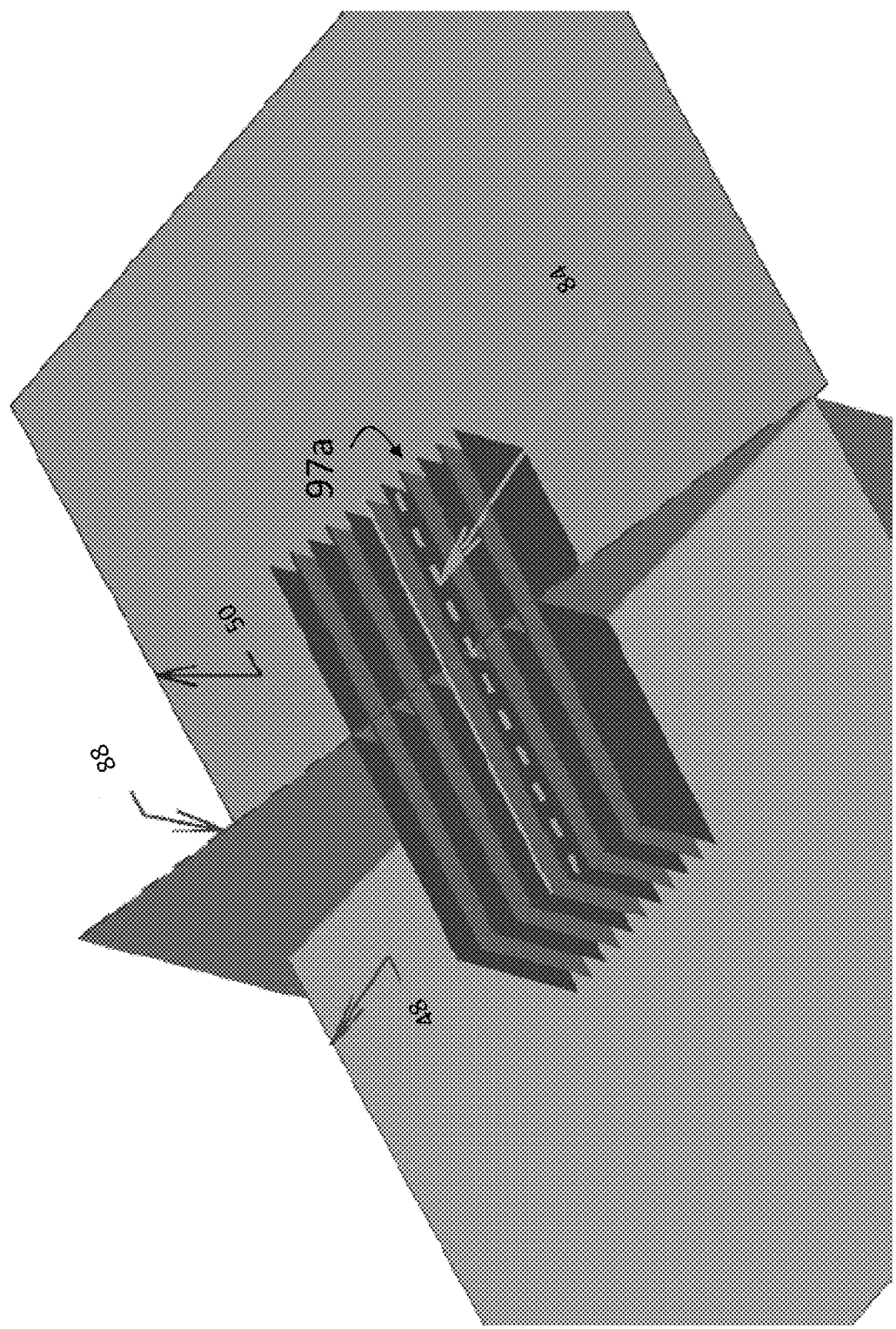
FIG. 13B illustrates a schematic representation of the digitizing planes of the fifth patch, according to at least one embodiment of the invention.

The CNC machine 10 may generate digitizing planes (e.g., plane 97a) that extend from each of the lines representing a fifth patch. FIG. 13B illustrates a schematic representation of the digitizing planes of the fifth patch, according to at least one embodiment of the invention. The digitizing planes may be perpendicular to the top plane 46 and separately perpendicular to the web centerline 88. The digitizing planes may extend between either intake valve plane 48 or exhaust valve plane 50 and top plane 46.

Figure 14A:
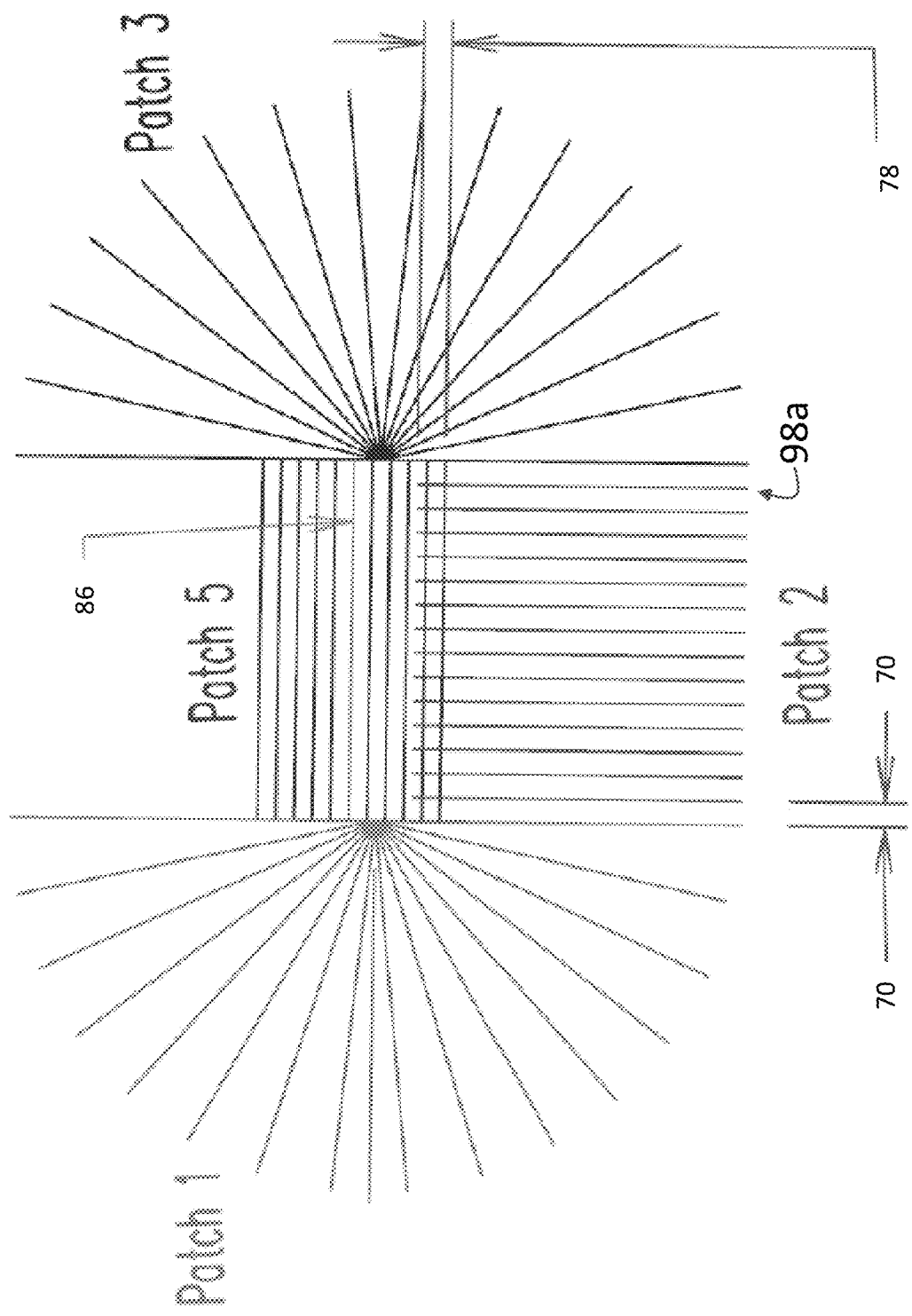
FIG. 14A illustrates a schematic representation of the plurality of patch lines representing a second patch, according to at least one embodiment of the invention.

The CNC machine 10 may generate a plurality of patch lines representing a second patch. FIG. 14A illustrates a schematic representation of the plurality of patch lines (e.g., patch line 98a) representing a second patch, according to at least one embodiment of the invention. The plurality of patch lines representing a second patch, including line 98a, may be perpendicular to fifth patch centerline 86. Each of the plurality of patch lines representing a second patch may have a length approximately equal to half of the length of exhaust valve plane 50. The plurality of patch lines representing a second patch may be equally spaced by a step over distance value. The plurality of patch lines representing a second patch may overlap at least one of the plurality of patch lines representing a fifth patch (e.g., overlap 78).

Figure 14B:
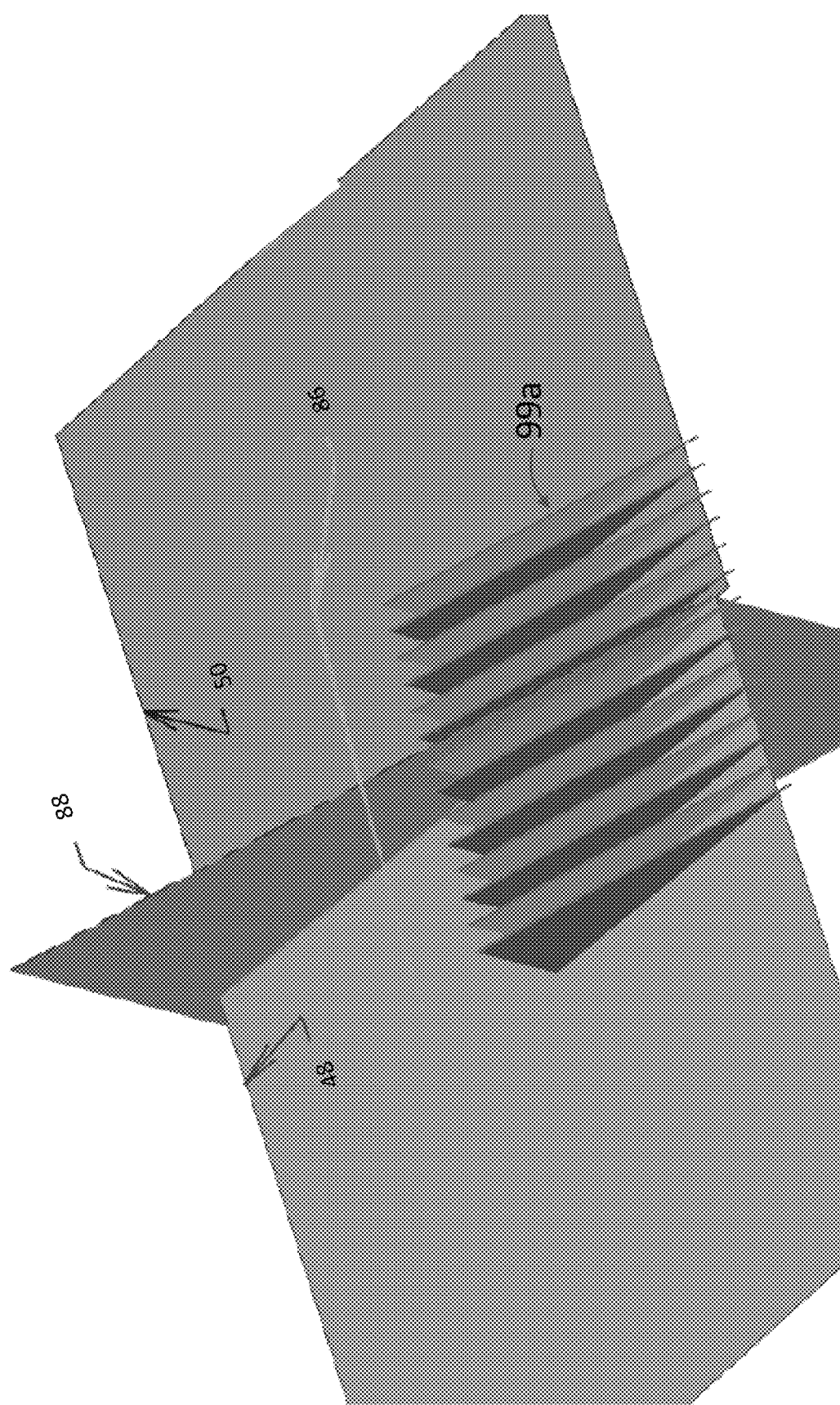
FIG. 14B illustrates a schematic representation of the digitizing planes of the second patch, according to at least one embodiment of the invention.

The CNC machine 10 may generate digitizing planes (e.g., plane 99a) that extend from each of the lines representing a second patch. FIG. 14B illustrates a schematic representation of the digitizing planes of the second patch, according to at least one embodiment of the invention. The digitizing planes may be perpendicular to the top plane 46 and separately parallel to the web centerline 88. The digitizing planes may extend between either intake valve plane 48 or exhaust valve plane 50 and top plane 46.

Figure 15A:
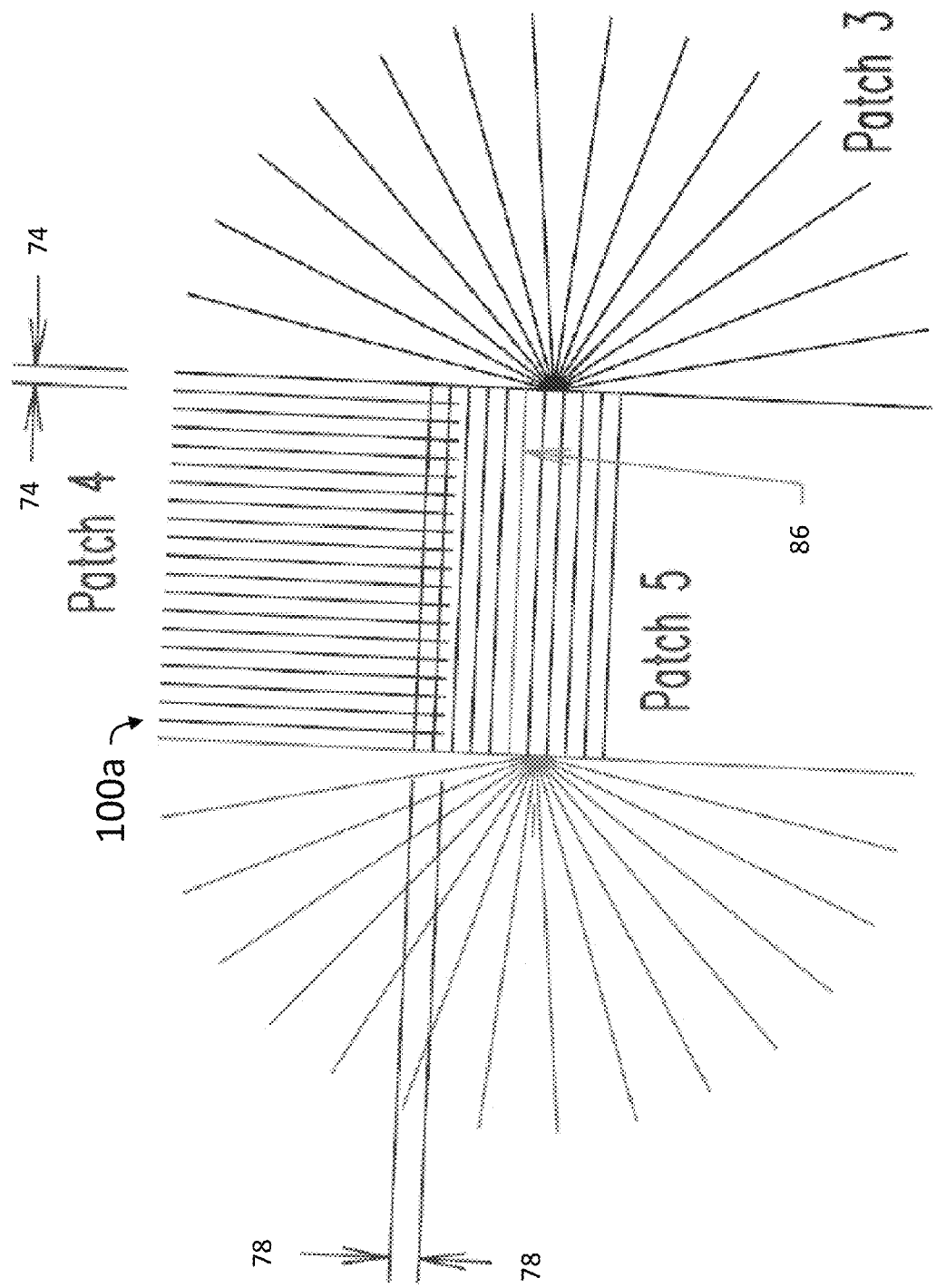
FIG. 15A illustrates a schematic representation of the plurality of patch lines representing a fourth patch, according to at least one embodiment of the invention.

The CNC machine 10 may generate a plurality of patch lines representing a fourth patch. FIG. 15A illustrates a schematic representation of the plurality of patch lines (e.g., line 100a) representing a fourth patch, according to at least one embodiment of the invention. The plurality of patch lines representing a fourth patch, including line 100a, may be perpendicular to fifth patch centerline 86. Each of the plurality of patch lines representing a fourth patch may have a length approximately equal to half of the length of exhaust valve plane 50. The plurality of patch lines representing a fourth patch may be equally spaced by a step over distance amount 70. The plurality of patch lines representing a fourth patch may overlap at least one of the plurality of patch lines representing a fifth patch (e.g., overlap 78).

Figure 15B:
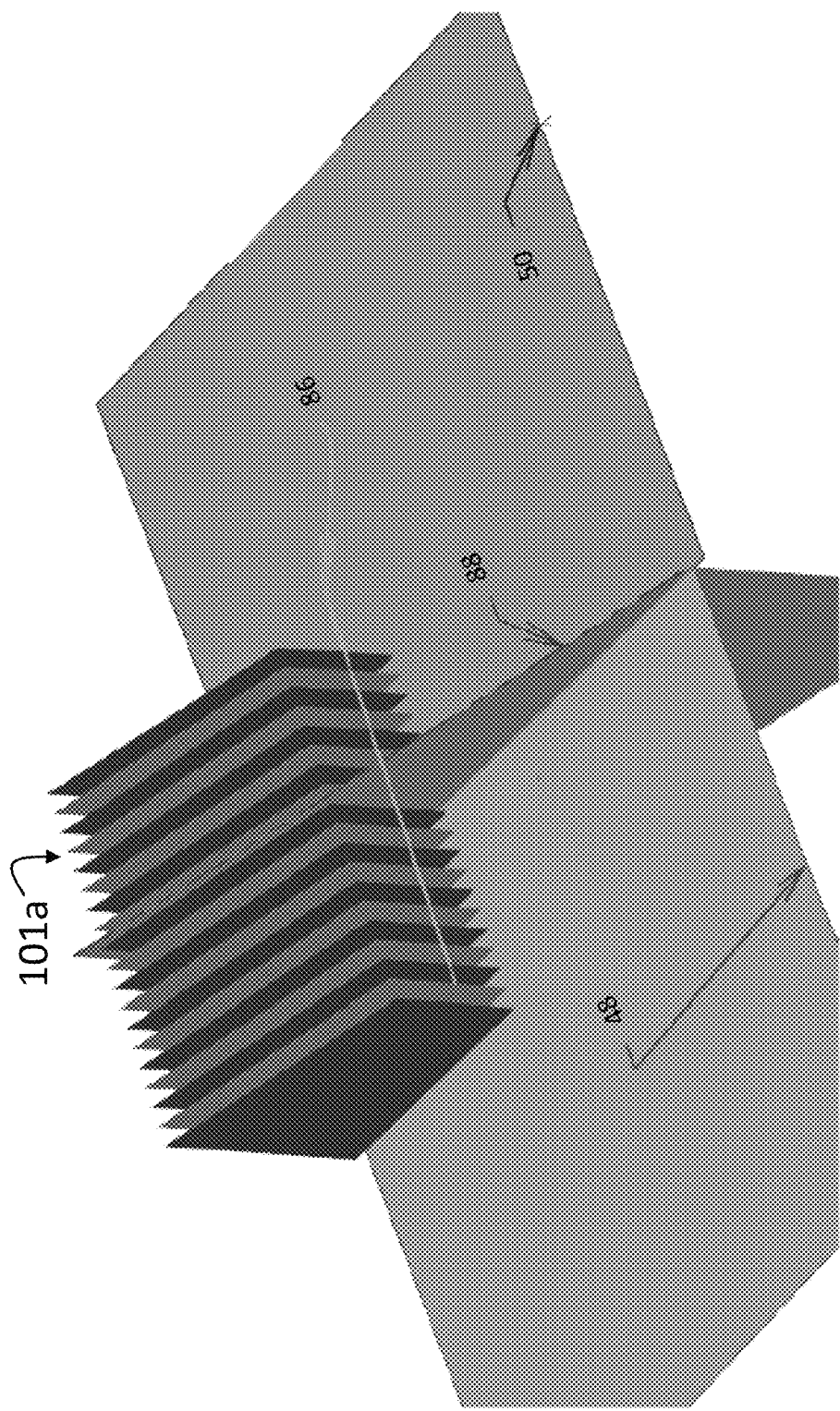
FIG. 15B illustrates a schematic representation of the digitizing planes of the fourth patch, according to at least one embodiment of the invention.

The CNC machine 10 may generate digitizing planes (e.g., plane 101a) that extend from each of the lines representing a fourth patch. FIG. 15B illustrates a schematic representation of the digitizing planes of the fourth patch, according to at least one embodiment of the invention. The digitizing planes may be perpendicular to the top plane 46 and separately parallel to the web centerline 88. The digitizing planes may extend between either intake valve plane 48 or exhaust valve plane 50 and top plane 46.

Patch Specific Start and Stop Conditions

After the digitizing planes are generated, the CNC machine 10 may initiate digitization of the patch lines.

For each respective patch line, the CNC machine 10 may be configured to cause the probe 18 to position at an initial starting point parallel to the intake valve plane 48 and exhaust valve plane 50.

Next, the CNC machine 10 may be configured to cause the probe 18 to horizontally traverse the respective patch line, in the corresponding digitized plane, until the stylus 20 contacts a surface of the chamber 28. In response, the CNC machine 10 may indicate that the surface is detected.

After a surface of the chamber 28 is detected, the CNC machine 10 may record the XYZAB coordinate position of the probe 18 for the respective patch line. Then, the CNC machine 10 may be configured to cause the probe 18 to continue traversing the patch line, including moving the probe 18 upward or downward while also traversing in a horizontal direction, until another surface is detected.

The CNC machine 10 may repeat the probe traversal, until the CNC machine 10 reaches a point that corresponds to an end of a patch line, the top of the corresponding digitizing plane and/or a point that intersects a top plane 46. In response, the CNC machine 10 may record the XYZAB coordinate position of the probe 18 for the respective patch line. The CNC machine 10 then may repeat the probe traversal for the subsequent patch line.

Program Output

Figure 16:
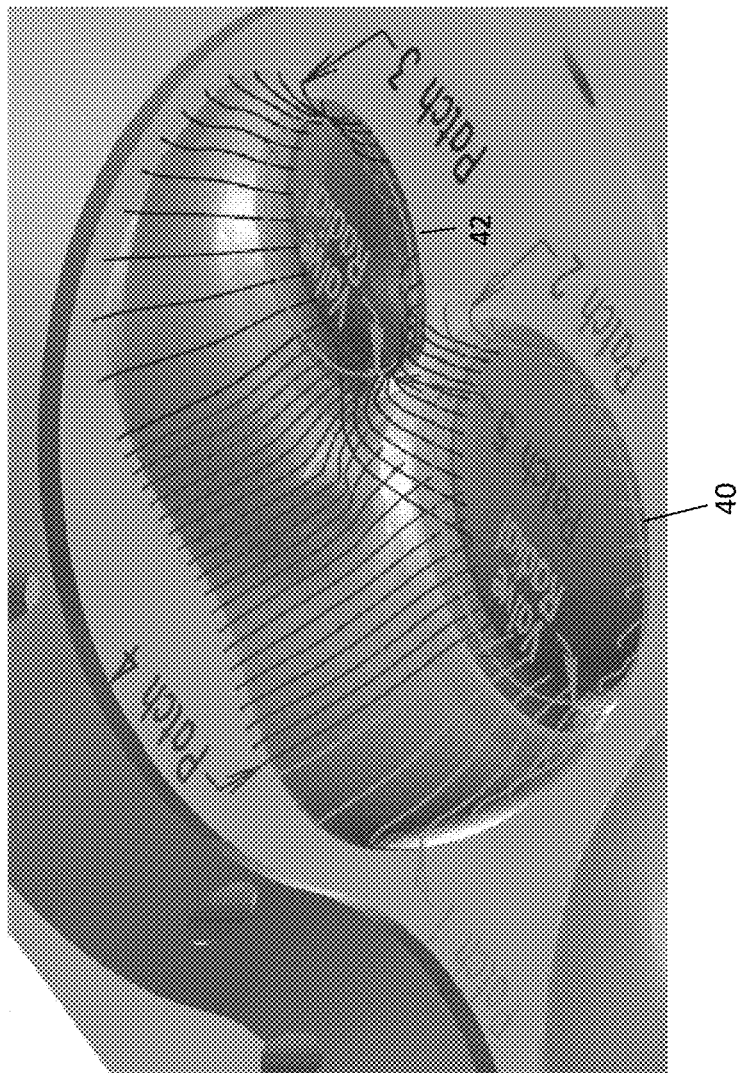
FIG. 16 illustrates output images generated by the CNC machine implementing at least some of the methods described herein, according to at least some embodiments of the invention.

FIG. 16 illustrates output images generated by the CNC machine 10 implementing at least some of the methods described herein, according to at least some embodiments of the invention. Each of the patch lines for the first patch, second patch, third patch, fourth patch and fifth patch are shown along with a valve radial 102 indicating the circumference of either the intake valve 40 or exhaust valve 42.

Additional Exemplary Embodiment

In one embodiment, there is a method for measuring and digitizing a cylinder head combustion chamber using a probe, wherein the cylinder head combustion chamber includes an intake valve and an exhaust valve the method comprising: receiving combustion chamber characteristics of the cylinder head combustion chamber; receiving probe measurement variables that are used by the probe to measure the cylinder head combustion chamber; generating probe measurement lines and probe measurement planes for each portion of the cylinder head combustion chamber using the combustion chamber characteristics and the probe measurement variables; and digitizing probe measurement planes for each portion of the cylinder head combustion chamber by measuring, using the probe, positions along the probe measurement lines for each portion of the cylinder head combustion chamber.

In some embodiments, the combustion chamber characteristics include a top plane, an intake valve plane and an exhaust valve plane.

In some embodiments, the digitizing variables including step angle, and step over distance.

In some embodiments, measuring positions along the probe measurement lines includes: traversing the probe along each probe measurement line for each portion of the cylinder head combustion chamber while the probe meets probe measurement criteria; periodically measuring a series of probe points along each probe measurement line for each portion of the cylinder head combustion chamber to generate the positions for each probe measurement line.

In some embodiments, probe measurement criteria includes a criterion that is met when a height of the touch probe is less than the top plane.

In some embodiments, generating probe measurement lines for each portion of the cylinder head combustion chamber includes: for a first portion of the cylinder head combustion chamber (e.g., a first patch): projecting a center point of the intake valve and a center point of the exhaust valve onto the top plane; and generating a series of probe measurement lines extending from the center point of the exhaust valve in a direction opposite to the center point of the intake valve, wherein each probe measurement line is separated by the step angle.

In some embodiments, generating probe measurement lines for each portion of the cylinder head combustion chamber includes: for a second portion of the cylinder head combustion chamber (e.g., a second patch): projecting a center point of the intake valve and a center point of the exhaust valve onto the top plane and defining a center line that is parallel to a line that intersects the center point of the intake valve and the center point of the exhaust valve; and generating a series of probe measurement lines extending perpendicular from the center line in a first direction, wherein each probe measurement line is separated by the step over distance.

In some embodiments, generating probe measurement lines for each portion of the cylinder head combustion chamber includes: for a third portion of the cylinder head combustion chamber (e.g., a third patch): projecting a center point of the intake valve and a center point of the exhaust valve onto the top plane; and generating a series of probe measurement lines extending from the center point of the intake valve in a direction opposite to the center point of the exhaust valve, wherein each probe measurement line is separated by the step angle.

In some embodiments, generating probe measurement lines for each portion of the cylinder head combustion chamber includes: for a fourth portion of the cylinder head combustion chamber (e.g., a fourth patch): generating a series of probe measurement lines extending perpendicular from the center line in a second direction that is opposite of the first direction, wherein each probe measurement line is separated by the step over distance.

In some embodiments, generating probe measurement lines for each portion of the cylinder head combustion chamber includes: for a fifth portion of the cylinder head combustion chamber (e.g., a fifth patch): projecting a center point of the intake valve and a center point of the exhaust valve onto the top plane and defining a center line that is parallel to a line that intersects the center point of the intake valve and the center point of the exhaust valve; and generating a series of probe measurement lines parallel to the center line, wherein each probe measurement line is separated by the step over distance.

Additional Embodiments

In some embodiments, multiple setups can be selected that have been saved to run in a macro form.

In some embodiments, a program may be generated from chamber data that was digitized with sufficiently fine step overs by replaying the probed points on the planes in a zig zag pattern (e.g., Up one plane and then down the next).

In some embodiments, the compound angle of a hole or pin can be automatically determined. In the case of a hole, the probe tip would be placed down in the hole. The function would find the center of a bore, then move down in Z and repeat the find center function. The angle would be calculated based on the center points and the machine tilted to the calculated angle such that the ball remained fixed in 5 axis space. The function may run a few times each time increasing accuracy. A similar function would work on a pin by finding the center of a rectangular web.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. The words "right", "left", "lower" and "upper" designate directions in the drawings to which reference is made. The words "inwardly" and "outwardly" refer to directions toward and away from, respectively, the geometric center of any device specified herein. Unless specifically set forth herein, the terms "a", "an" and "the" are not limited to one element but instead should be read as meaning "at least one". As used herein, the term "about" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

The invention claimed is:

1. A computer numerical control machine comprising:
   a probe;
   one or more memory units each operable to store at least one program; and
   at least one processor communicatively coupled to the one or more memory units, in which the at least one program, when executed by the at least one processor, causes the at least one processor to perform the steps of:
      receiving combustion chamber characteristics of the cylinder head combustion chamber;
      receiving probe measurement variables that are used by the probe to measure the cylinder head combustion chamber; and
      generating probe measurement lines and probe measurement planes for each portion of the cylinder head combustion chamber using the combustion chamber characteristics and the probe measurement variables.

2. The computer numerical control machine of claim 1, wherein the combustion chamber characteristics includes a top plane, an intake valve plane and an exhaust valve plane.

3. The computer numerical control machine of claim 2, wherein the digitizing variables include step angle and step over distance.

4. The computer numerical control machine of claim 3, wherein measuring positions along the probe measurement lines includes:
   traversing the probe along each probe measurement line for each portion of the cylinder head combustion chamber while the probe meets probe measurement criteria;
   periodically measuring a series of probe points along each probe measurement line for each portion of the cylinder head combustion chamber to generate the positions for each probe measurement line.

5. The computer numerical control machine of claim 4, wherein probe measurement criteria includes a criterion that is met when a height of the probe is less than the top plane.

6. The computer numerical control machine of claim 5, wherein generating probe measurement lines for each portion of the cylinder head combustion chamber includes:
for a first portion of the cylinder head combustion chamber:
projecting a center point of the intake valve and a center point of the exhaust valve onto the top plane; and
generating a series of probe measurement lines extending from the center point of the exhaust valve, wherein each probe measurement line extends in a direction parallel to, or away from, the center point of the intake valve, wherein each probe measurement line is separated by the step angle.

7. The computer numerical control machine of claim 6, wherein generating probe measurement lines for each portion of the cylinder head combustion chamber includes:
for a second portion of the cylinder head combustion chamber:
projecting a center point of the intake valve and a center point of the exhaust valve onto the top plane and defining a center line that is parallel to a line that intersects the center point of the intake valve and the center point of the exhaust valve; and
generating a series of probe measurement lines extending perpendicular from the center line in a first direction, wherein each probe measurement line is separated by the step over distance.

8. The computer numerical control machine of claim 7, wherein generating probe measurement lines for each portion of the cylinder head combustion chamber includes:
for a third portion of the cylinder head combustion chamber:
projecting a center point of the intake valve and a center point of the exhaust valve onto the top plane; and
generating a series of probe measurement lines extending from the center point of the intake valve, wherein each probe measurement line extends in a direction parallel to, or away from, the center point of the exhaust valve, wherein each probe measurement line is separated by the step angle.

9. The computer numerical control machine of claim 8, wherein generating probe measurement lines for each portion of the cylinder head combustion chamber includes:
for a fourth portion of the cylinder head combustion chamber:
generating a series of probe measurement lines extending perpendicular from the center line in a second direction that is opposite of the first direction, wherein each probe measurement line is separated by the step over distance.

10. The computer numerical control machine of claim 9, wherein generating probe measurement lines for each portion of the cylinder head combustion chamber includes:
for a fifth portion of the cylinder head combustion chamber:
projecting a center point of the intake valve and a center point of the exhaust valve onto the top plane and defining a center line that is parallel to a line that intersects the center point of the intake valve and the center point of the exhaust valve; and
generating a series of probe measurement lines parallel to the center line, wherein each probe measurement line is separated by the step over distance.

11. A method for operating a computer numerical control machine comprising:
receiving combustion chamber characteristics of a cylinder head combustion chamber;
receiving probe measurement variables that are used by a probe to measure the cylinder head combustion chamber;
generating probe measurement lines and probe measurement planes for each portion of the cylinder head combustion chamber using the combustion chamber characteristics and the probe measurement variables.

12. The method of claim 11, wherein the combustion chamber characteristics includes a top plane, an intake valve plane and an exhaust valve plane.

13. The method of claim 12, wherein the digitizing variables include step angle and step over distance.

14. The method of claim 13, wherein measuring positions along the probe measurement lines includes:
traversing the probe along each probe measurement line for each portion of the cylinder head combustion chamber while the probe meets probe measurement criteria;
periodically measuring a series of probe points along each probe measurement line for each portion of the cylinder head combustion chamber to generate the positions for each probe measurement line.

15. The method of claim 14, wherein probe measurement criteria includes a criterion that is met when a height of the probe is less than the top plane.

16. The method of claim 15, wherein generating probe measurement lines for each portion of the cylinder head combustion chamber includes:
for a first portion of the cylinder head combustion chamber:
projecting a center point of the intake valve and a center point of the exhaust valve onto the top plane; and
generating a series of probe measurement lines extending from the center point of the exhaust valve, wherein each probe measurement line extends in a direction parallel to, or away from, the center point of the intake valve, wherein each probe measurement line is separated by the step angle.

17. The method of claim 16, wherein generating probe measurement lines for each portion of the cylinder head combustion chamber includes:
for a second portion of the cylinder head combustion chamber:
projecting a center point of the intake valve and a center point of the exhaust valve onto the top plane and defining a center line that is parallel to a line that intersects the center point of the intake valve and the center point of the exhaust valve; and
generating a series of probe measurement lines extending perpendicular from the center line in a first direction, wherein each probe measurement line is separated by the step over distance.

18. The method of claim 17, wherein generating probe measurement lines for each portion of the cylinder head combustion chamber includes:
for a third portion of the cylinder head combustion chamber:
projecting a center point of the intake valve and a center point of the exhaust valve onto the top plane; and
generating a series of probe measurement lines extending from the center point of the intake valve, wherein each probe measurement line extends in a direction parallel to, or away from, the center point of the exhaust valve, wherein each probe measurement line is separated by the step angle.

19. The method of claim 18, wherein generating probe measurement lines for each portion of the cylinder head combustion chamber includes:

for a fourth portion of the cylinder head combustion chamber:

generating a series of probe measurement lines extending perpendicular from the center line in a second direction that is opposite of the first direction, wherein each probe measurement line is separated by the step over distance.

20. The method of claim 19, wherein generating probe measurement lines for each portion of the cylinder head combustion chamber includes:

for a fifth portion of the cylinder head combustion chamber:

projecting a center point of the intake valve and a center point of the exhaust valve onto the top plane and defining a center line that is parallel to a line that intersects the center point of the intake valve and the center point of the exhaust valve; and generating a series of probe measurement lines parallel to the center line, wherein each probe measurement line is separated by the step over distance.

21. The computer numerical control machine of claim 1, wherein the at least one program, when executed by the at least one processor, causes the at least one processor to further perform the step of:

digitizing probe measurement planes for each portion of the cylinder head combustion chamber by measuring, using the probe, positions along the probe measurement lines for each portion of the cylinder head combustion chamber.

22. The method of claim 11, further comprising:

digitizing probe measurement planes for each portion of the cylinder head combustion chamber by measuring, using the probe, positions along the probe measurement lines for each portion of the cylinder head combustion chamber.

* * * * *